United States Patent [19]
Beck et al.

[11] Patent Number: 5,246,647
[45] Date of Patent: Sep. 21, 1993

[54] PROCESS OF MAKING MICROPOROUS HOLLOW FIBER OR FILM MEMBRANE OF POLY(PHENYLENE SULFIDE) (PPS)

[75] Inventors: Henry N. Beck, Walnut Creek; Robert D. Mahoney, Danville; Hawk S. Wan, Antioch, all of Calif.; Chieh-Chun Chau; Timothy M. Finney, both of Midland, Mich.; Ritchie A. Wessling, Berkeley, Calif.; Jiro Kawamoto, Walnut Creek, Calif.; Mark F. Sonnenschein, Antioch, Calif.

[73] Assignee: The Dow Chemical Company, Midland, Mich.

[21] Appl. No.: 746,756

[22] Filed: Aug. 19, 1991

Related U.S. Application Data

[63] Continuation-in-part of Ser. No. 329,666, Mar. 28, 1989, Pat. No. 5,043,112.

[51] Int. Cl.⁵ .................... B29C 67/20; D01D 5/247
[52] U.S. Cl. ...................................... 264/41; 264/184; 264/203; 264/205; 264/210.3; 264/210.8; 264/211.15; 264/211.16; 264/211.18; 264/211.19; 264/288.8; 264/289.6; 264/290.5
[58] Field of Search ................. 264/41, 184, 203, 205, 264/209.4, 209.5, 210.1, 210.3, 210.8, 211.15, 211.16, 211.18, 211.19, 288.8, 289.6, 290.5

[56] References Cited

U.S. PATENT DOCUMENTS

| | | |
|---|---|---|
| 2,935,488 | 3/1960 | Phillips et al. |
| 3,339,341 | 9/1967 | Maxwell et al. ............ 55/16 |
| 3,832,830 | 9/1974 | Gerow ..................... 55/158 |
| 4,118,363 | 10/1978 | Hill . |
| 4,367,139 | 1/1983 | Graham ............... 210/321.3 |
| 4,451,369 | 5/1984 | Sekino et al. ........... 210/321.1 |
| 4,508,548 | 4/1985 | Mannatt ................. 55/158 |
| 4,707,267 | 11/1987 | Johnson ................ 210/650 |
| 4,734,106 | 3/1988 | Gollan ................... 55/16 |
| 4,781,831 | 11/1988 | Takemura et al. ...... 210/321.8 |
| 4,781,832 | 11/1988 | Sekino et al. ......... 210/321.88 |
| 4,871,379 | 10/1989 | Edwards ............... 55/158 |
| 4,904,426 | 2/1990 | Lundgard et al. ..... 264/41 |
| 4,929,259 | 5/1990 | Caskey et al. ........ 55/158 |
| 4,959,152 | 9/1990 | Nichols ................ 210/651 |
| 4,961,760 | 10/1990 | Caskey et al. ........ 55/158 |
| 5,013,331 | 5/1991 | Edwards et al. ...... 55/16 |
| 5,013,437 | 5/1991 | Trimmer et al. ...... 210/321.78 |
| 5,043,112 | 8/1991 | Beck .................... 264/41 |
| 5,057,600 | 10/1991 | Beck et al. ........... 528/480 |
| 5,064,580 | 11/1991 | Beck et al. ........... 264/28 |

FOREIGN PATENT DOCUMENTS 59-120779 6/1984 Japan .
63-258954 10/1988 Japan .

*Primary Examiner*—Leo B. Tentoni

[57] ABSTRACT

The present invention relates to a process for preparing a microporous permselective membrane from a poly(-phenylene sulfide) (PPS) polymer, an organic compound which substantially solubilizes the PPS below its melting point to form a homogenous mixture, heating the resulting mixture, extruding or casting the mixture into a membrane (fiber or film), quenching or coagulating the membrane, and leaching the membrane, while optionally drawing the membrane before, during, after leaching, or a combination thereof. In one embodiment, the solvent optionally includes an organic non-solvent to assist in obtaining the desired microporosity. The permselective polymers are useful to separate gaseous or liquid components from a mixture of components.

18 Claims, 7 Drawing Sheets

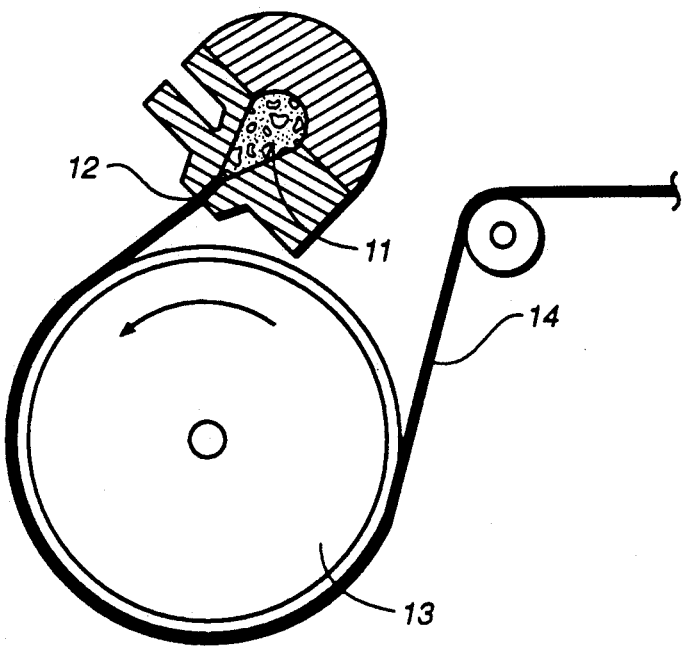
FIG._1A
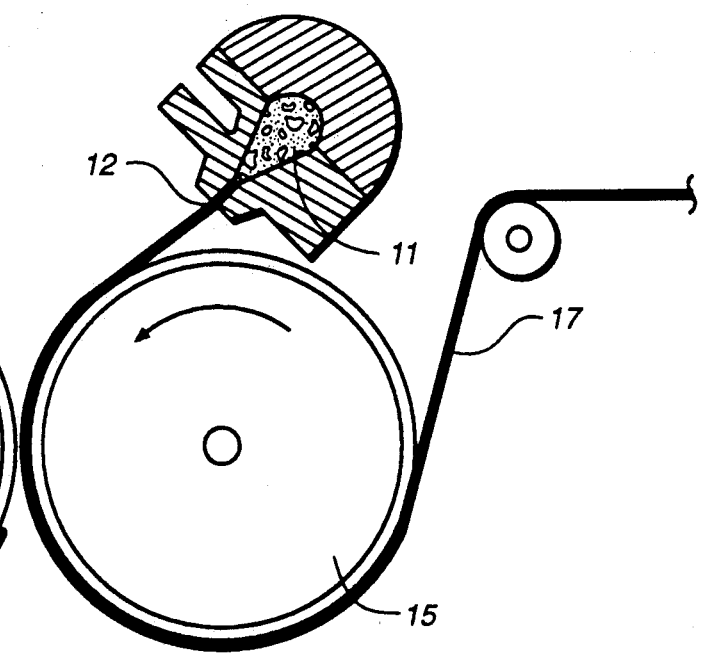
FIG._1B
FIG._6A
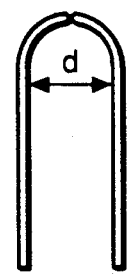
FIG._6B

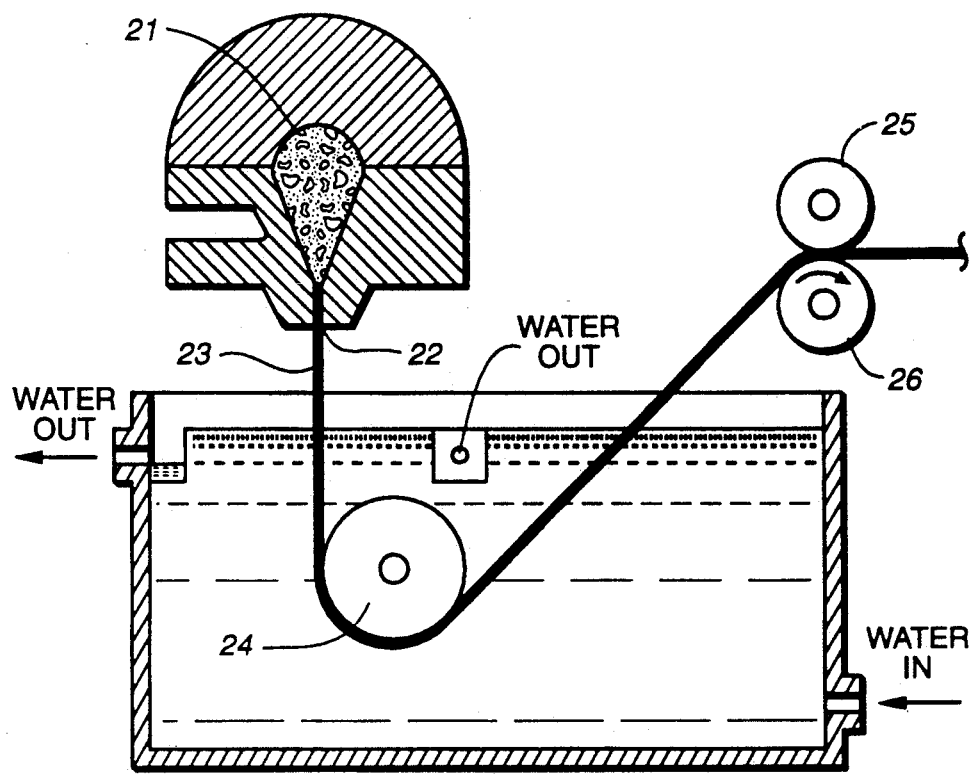
FIG._2A
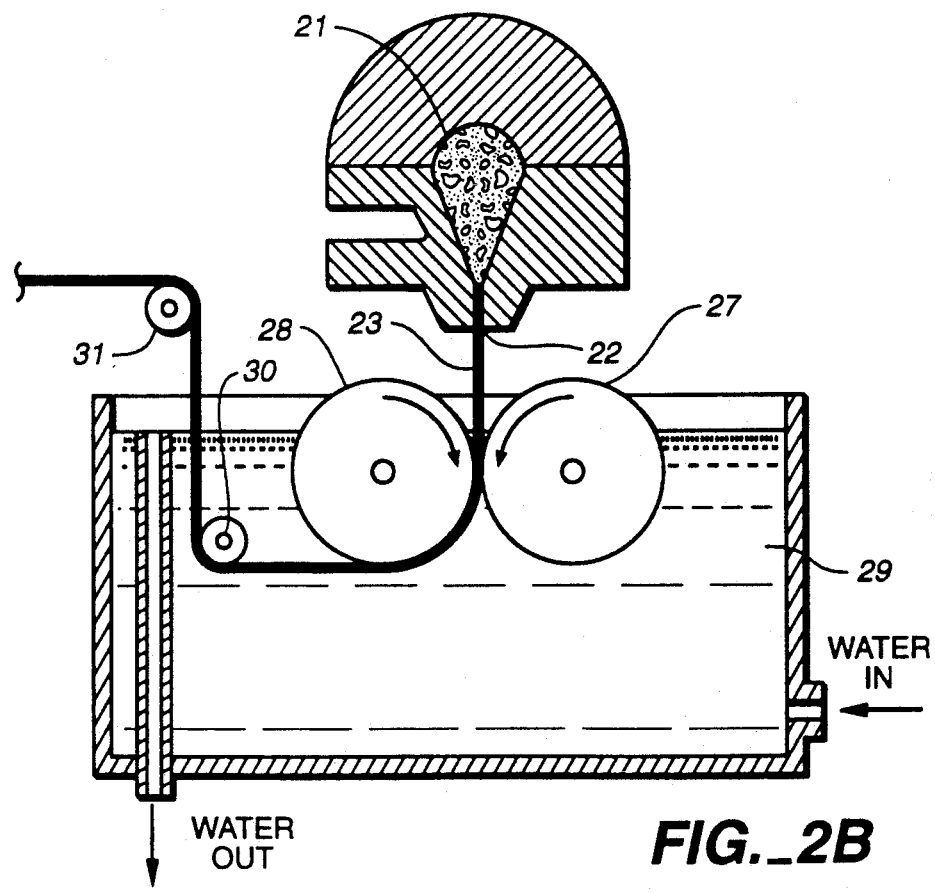
FIG._2B

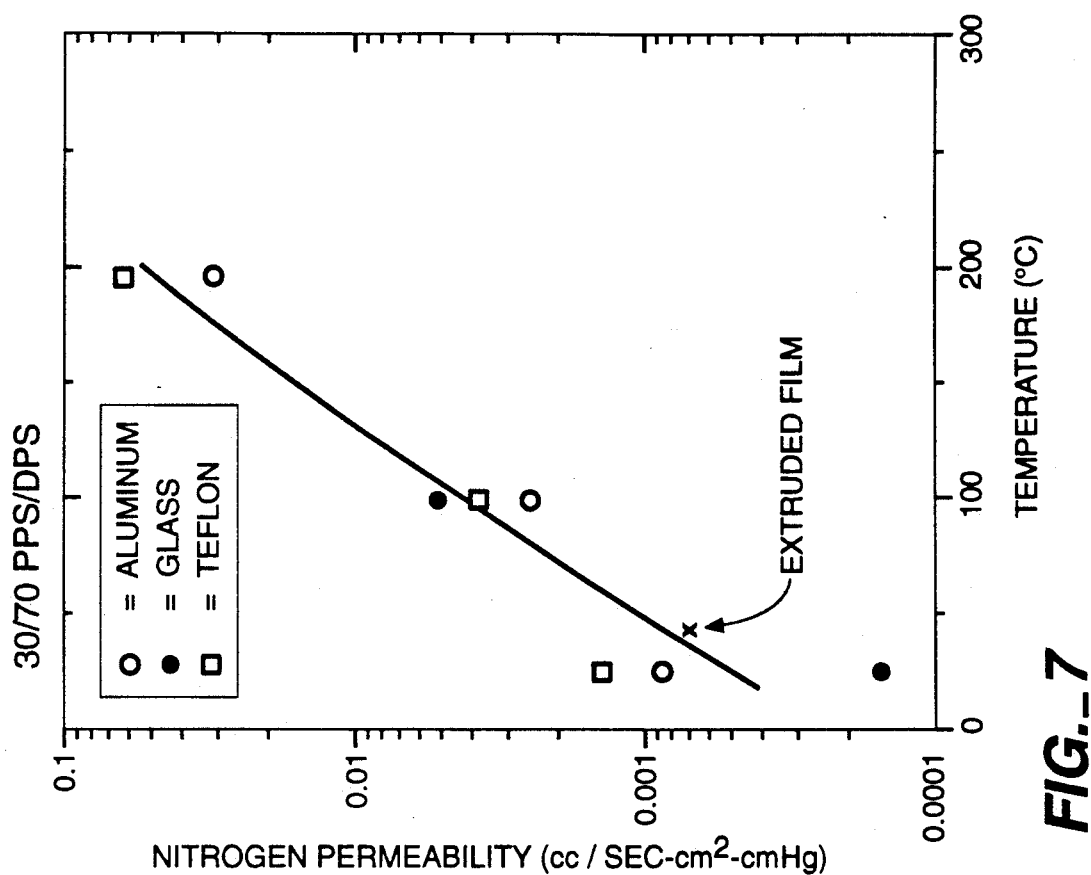
FIG._7
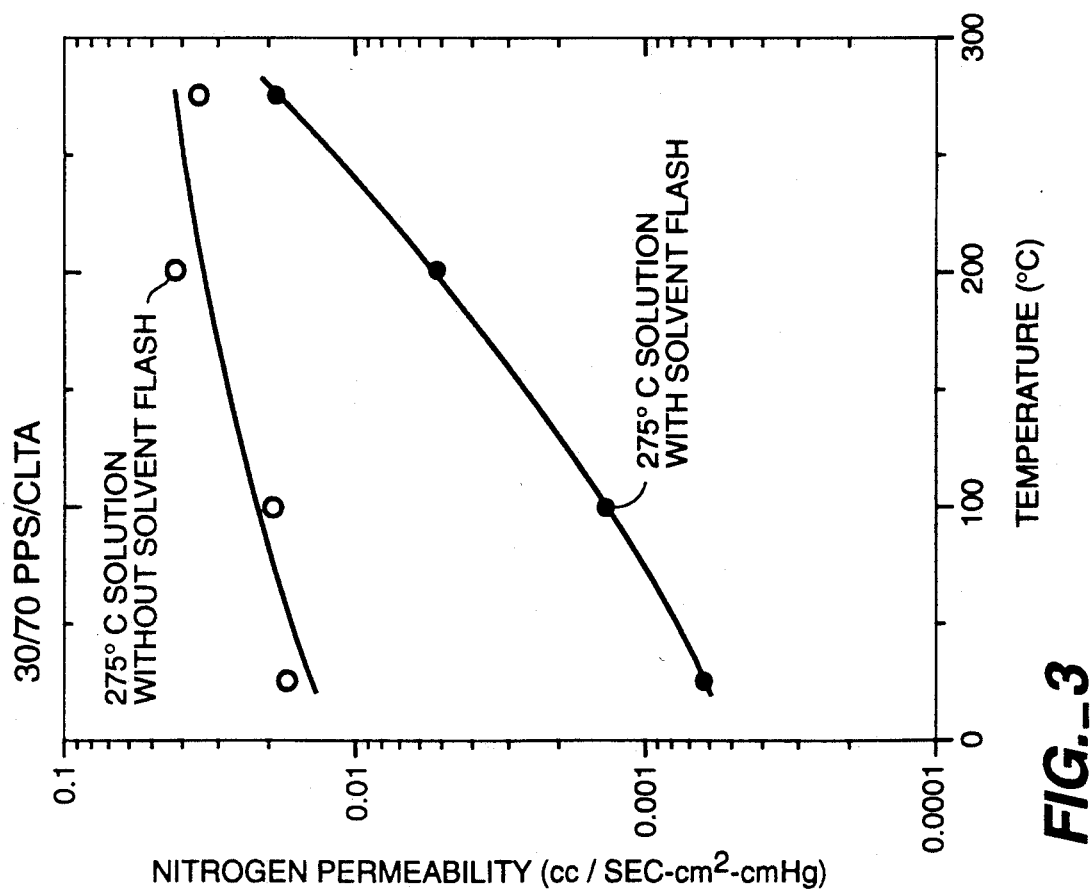
FIG._3

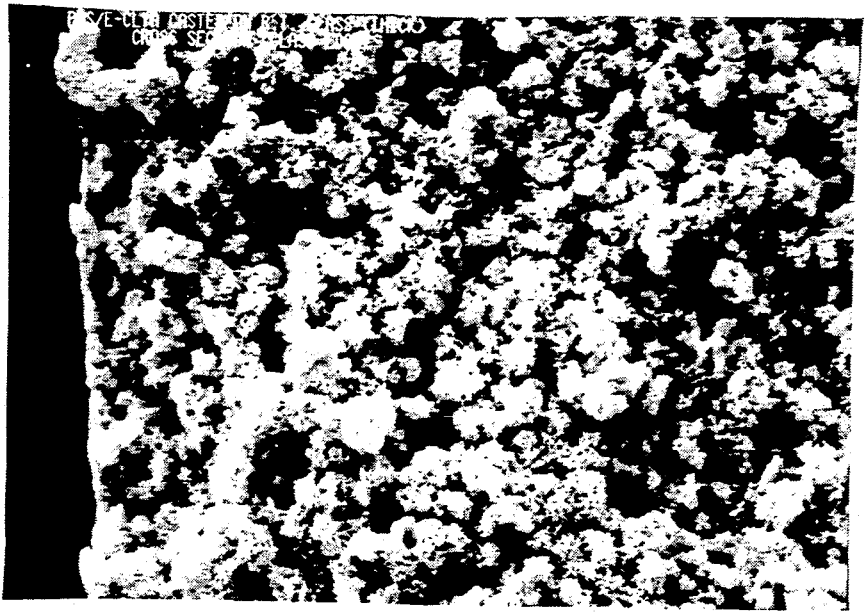
FIG._4
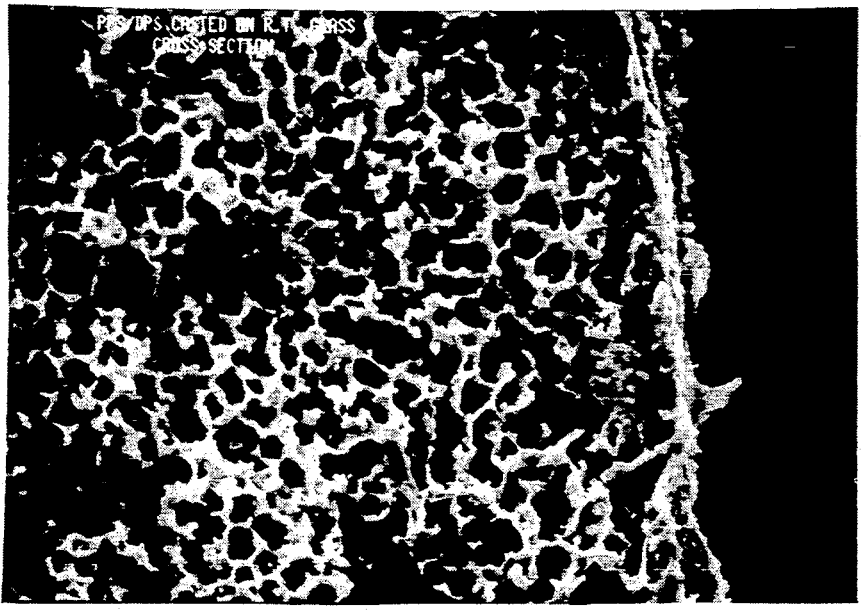
FIG._5

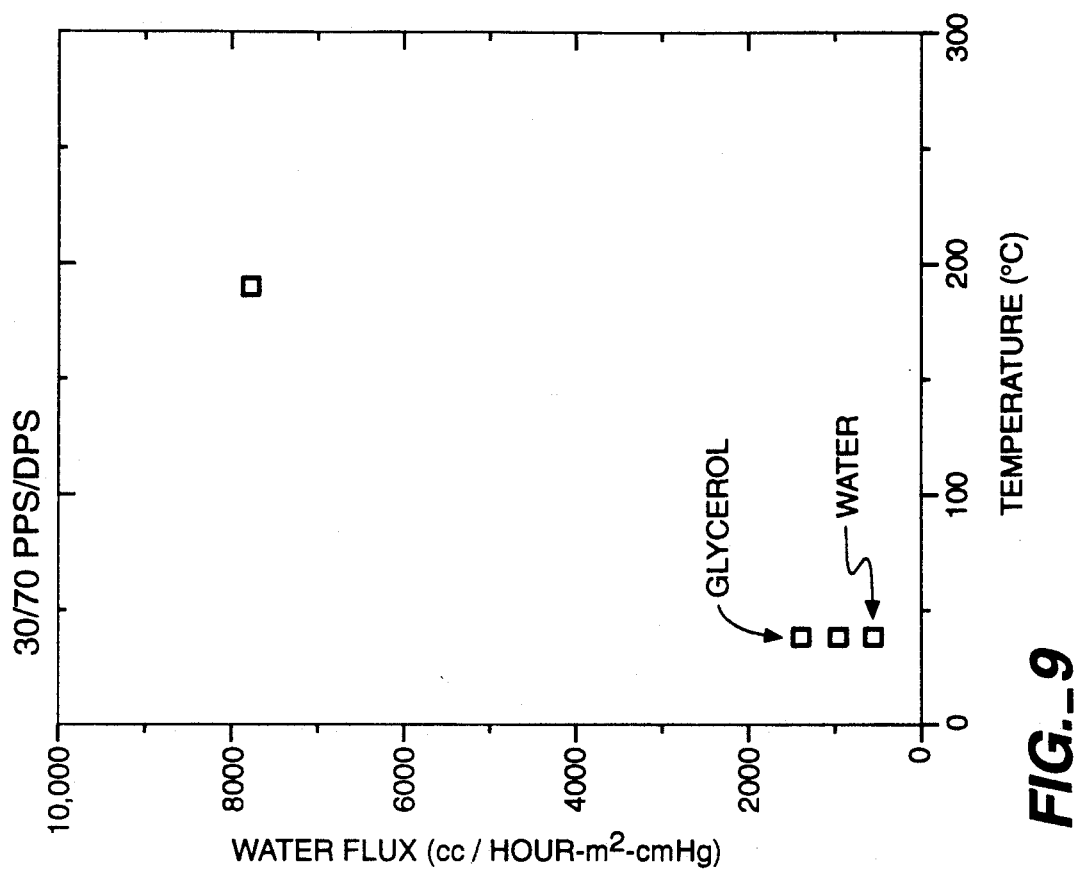
FIG._9
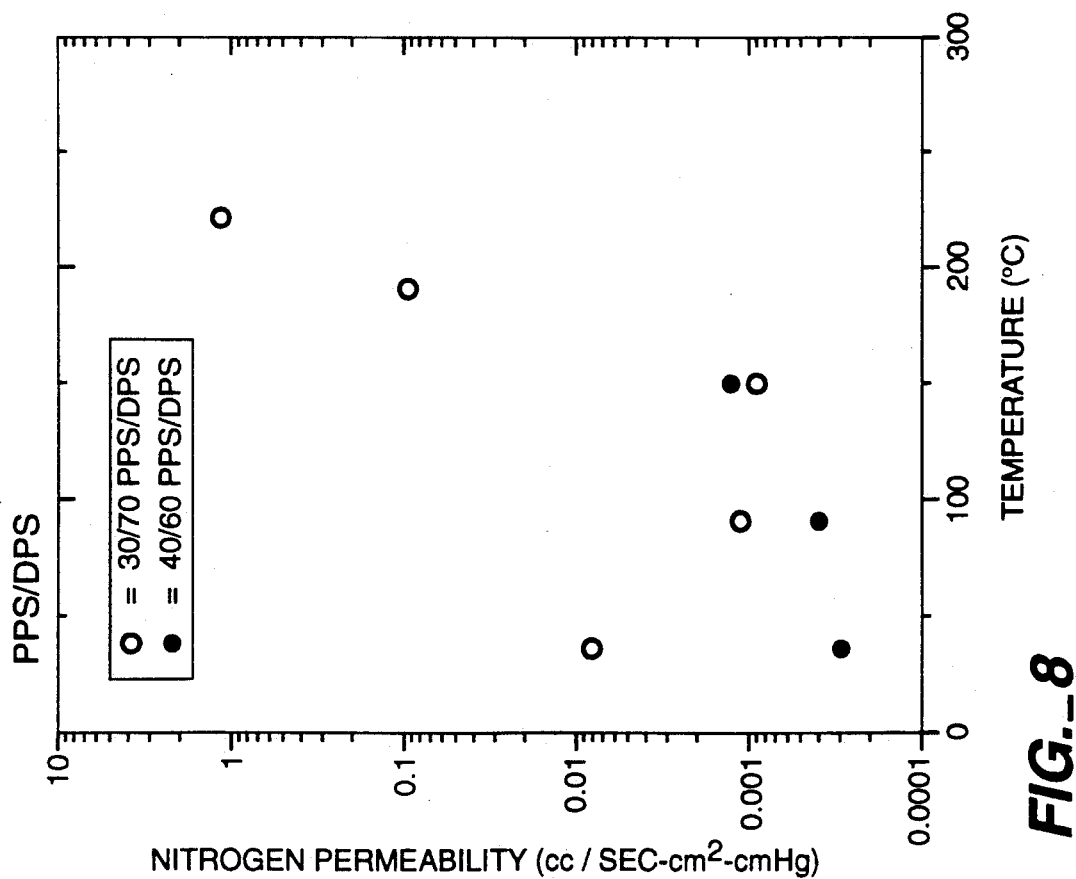
FIG._8

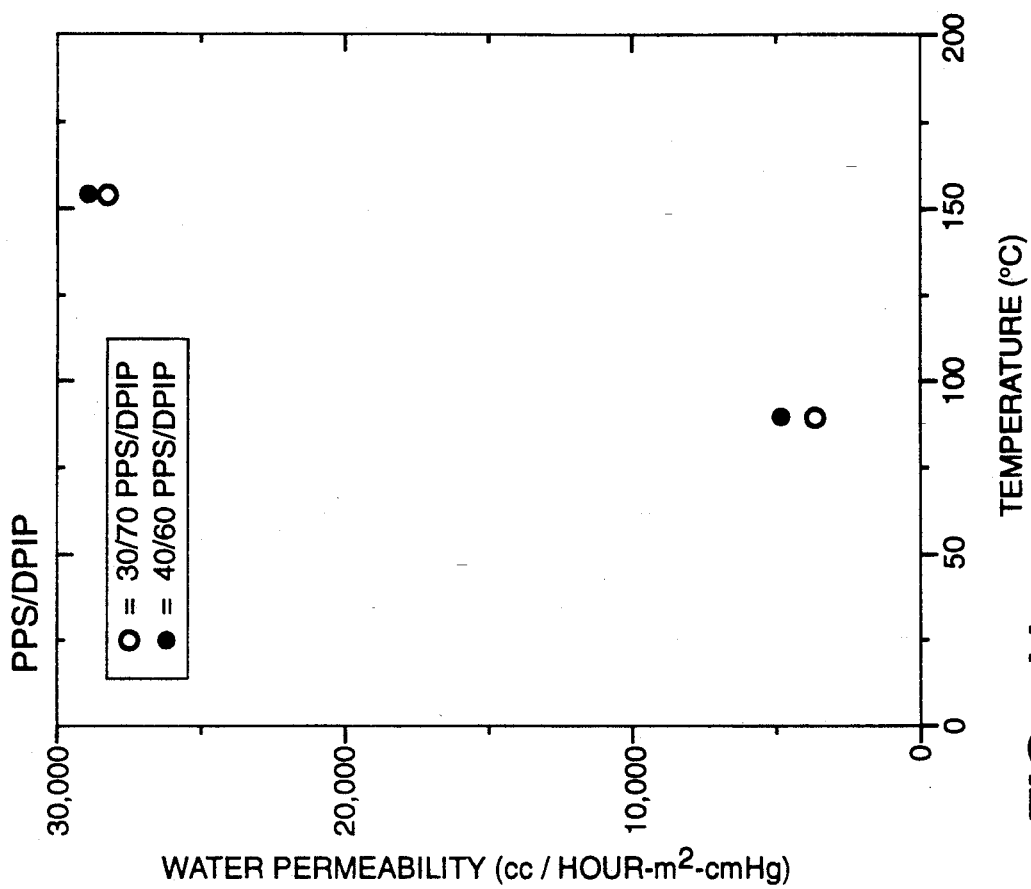
FIG._11
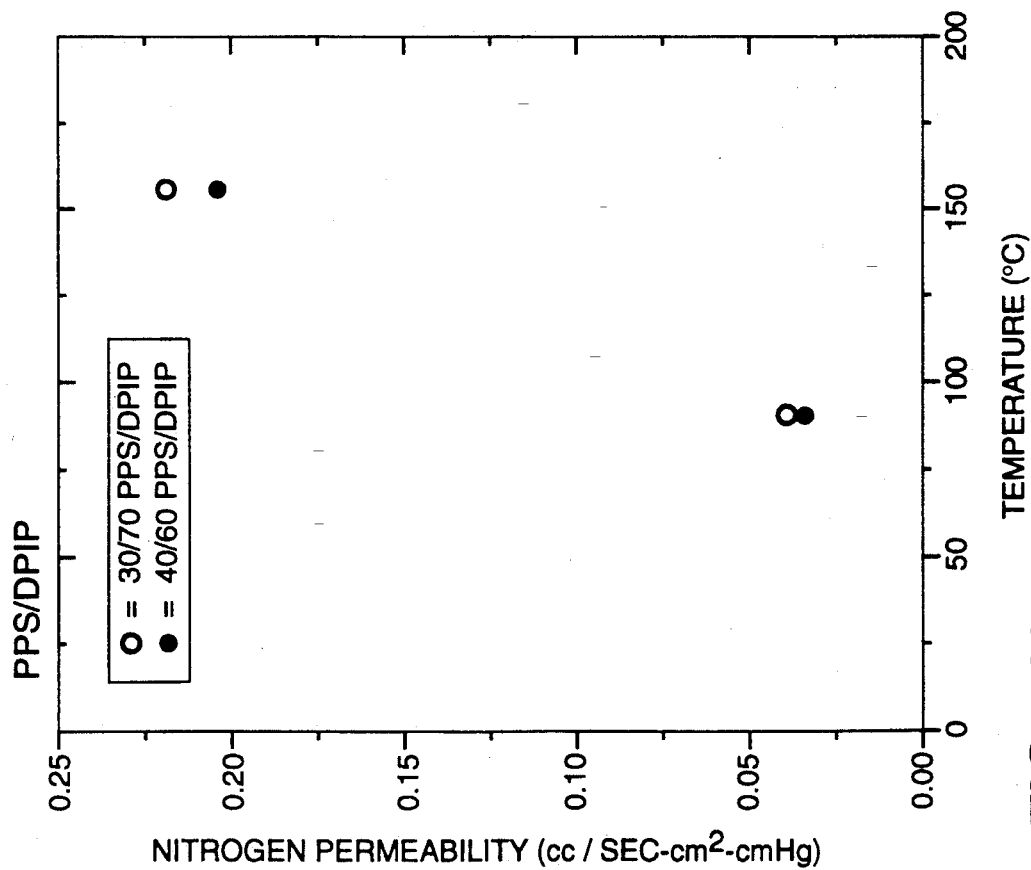
FIG._10

FIG._12

PROCESS OF MAKING MICROPOROUS HOLLOW FIBER OR FILM MEMBRANE OF POLY(PHENYLENE SULFIDE) (PPS)

BACKGROUND OF THE INVENTION

1. Related Applications

This application is a continuation-in-part application of U.S. Ser. No. 329,666, filed Mar. 28, 1989, now U.S. Pat. No. 5,043,112, which is incorporated by reference in its entirety. 2. Field of the Invention The present invention relates to the solubilization of solvent resistant polymers to form an article. More specifically, the present invention relates to a process to solubilize poly(phenylene sulfide) (PPS) at elevated temperatures using high boiling organic solvents, and to form a useful permselective fiber or film to separate liquids and/or gases.

3. Description of Related Art

Crystalline poly(phenylene sulfide) is a very useful high temperature polymeric material. The properties of commercially available PPS include:

A relatively high glass transition temperature of about 85–150 degrees C.,

2. A very high crystallized melting point of about 286 degrees C.,

3. Thermal stability, and

4. High solvent resistance. Unfortunately, these very properties make PPS a very difficult polymer to mold into desirable useful shaped articles, e.g. a hollow fiber or a film membrane.

The thermal stability and solvent resistance make PPS an ideal candidate for ultrafiltration membranes, hollow fibers, solid fibers and the like. However, the very useful thermal and solvent resistance of PPS presents severe problems in shaping the polymer into a desired form.

Formation of articles of manufacture from PPS requires special solvents for the polymers.

Most of the art provides for simple relatively low boiling solvents which were used to dissolve the reactants used to prepare the PPS from the monomers. Once PPS is formed, it usually separates from the polymerization solvent(s).

Poly(phenylene sulfide) is generally regarded as being insoluble in most common solvents. A number of hot aprotic polar organic compounds, peralkylated cyclic ureas, or N-alkyllactams such as N-methyl-2-pyrrolidinone, or N,N-diethylbenzamide, N,N-diethyltoluamide, N,N-dimethylethylene urea, dimethylacetamide, hexamethylphosphoramide or N-methylcaprolactam as described as "solvents" in the synthesis of PPS. It appears that these organic compounds are really solvents (or dispersants and/or heat transfer agents) for the reactants and from which the PPS precipitates after formation.

H. A. Hill in U.S. Pat. No. 4,118,363 discloses that PPS is a difficult polymer to solubilize, and that diphenyl oxide has been used as a high boiling solvent at elevated temperatures. Further, Hill discloses that alkyl substituted and halogen substituted diphenyl oxides have also been used to solubilize PPS.

Strongly acidic hot materials, such as concentrated sulfuric acid, chlorosulfonic acid, and trifluoromethylsulfonic acid, are suggested as solvents for PPS. However, these materials may react with aromatic portion of the polymer forming an acid derivative which as properties completely different than PPS, and the derivative then "dissolves" in the hot solvent.

J. Kawabata, et al., in Japanese Kokai patent application No. 59-120779 (Jun. 14, 1984) (Kokai No. 01-432) disclose the use of poly(phenylene sulfide) as a composite film for use in gas separation.

Poly(phenylene sulfide) as a polymer is described in detail by H. W. Hill, Jr. and D. G. Brady in "Poly(phenylene sulfide)" in Kirk-Othmer Encyclopedia of Chemical Technology, 3rd Ed., Vol.18, P.793–814 (1982), which is incorporated herein by reference.

Additional references of interest include for example:

Japanese patent disclosure 63-258954 (Oct. 26, 1988) assigned to Toray generally describes membranes of PPS using as solvent a lactam. No drawing, stretching or orientation step is disclosed to improve tensile or other physical properties. The hydraulic permeability of the membrane is so low, probably zero, as to be essentially useless.

Japanese patent disclosures No. 62-15323 (Jan. 23, 1987), No. 59-59917 (Apr. 5, 1984) and No. 58-67733 (assigned to Dainippon Ink and Chemicals) describe a production process for a porous or microporous hollow fibers. The process uses a melt spinning of PPS followed by stretching to create "porosity." There is no solvent or gas or liquid permeability described.

Japanese patent disclosure No. 61-000432 (Jan. 6, 1986) assigned to Dainippon Ink and Chemicals, describes a "porous" film of PPS.

Japanese patent disclosure No. 60-248202 (Dec. 7, 1985) assigned to Dainippon Ink and Chemicals, describes a hollow fiber membrane of PPS by dissolving in a solvent extruding a hollow fiber while coagulating it with a core liquid that is a mixture of solvent and a non-solvent. No drawing step is disclosed.

All patent applications, patents, references, articles, standards, etc. listed are incorporated herein by reference in their entirety.

None of the above references teach or suggest the present invention in the use of high boiling solvents and non-solvents, both comprising organic compounds, to solubilize poly(phenylene sulfide), forming the solubilized poly(phenylene sulfide) into the shape of an article of manufacture, removing the organic compound, and recovering the useful article (e.g. fiber or film) of poly(phenylene sulfide).

SUMMARY OF THE INVENTION

In one aspect, the present invention relates to a process for preparing a permselective microporous membrane comprising poly(phenylene sulfide), which process comprises the steps of:

(a) forming a mixture comprising:

(i) poly(phenylene sulfide)

(ii) at least one solvent for the polyphenylene sulfide;

(b) heating the mixture to a temperature under conditions such that a homogeneous fluid is formed which possesses sufficient viscosity to be formed into a membrane;

(c) extruding or casting the homogeneous fluid into a membrane form;

(d) quenching or coagulating the membrane by passing the membrane through one or more zones under physical conditions such that the membrane solidifies; and (e) simultaneously or consecutively leaching the membrane by passing the membrane through one or more zones under conditions such that at least a substantial portion of the solvent for the polyphenylene sulfide is removed from the membrane;

wherein the permselective membrane so formed possesses a microporous structure.

In a preferred embodiment, the process includes step (e') drawing (elongating) the membrane in a uniaxial or biaxial mode before, during and/or after leaching of step (e) at a temperature at or above ambient temperature and below the melting point of the polyphenylene sulfide or the depressed melting point of the mixture to elongate the membrane and to induce orientation of the polyphenylene sulfide in the membrane, and also to control micropore size.

In another aspect, the present invention relates to a process for preparing a permselective microporous membrane comprising poly(phenylene sulfide), which process comprises the steps of:

(a) forming a mixture comprising:
  (i) (polyphenylene sulfide)
  (ii) at least one solvent for the polyphenylene sulfide;
  (iii) at least one non-solvent for the polyphenylene sulfide;

(b) heating the mixture to a temperature under conditions such that a homogeneous fluid is formed which possesses sufficient viscosity to be formed into a membrane;

(c) extruding or casting the homogeneous fluid into a membrane;

(d) quenching or coagulating the membrane by passing the membrane through one or more zones under physical conditions such that the membrane solidifies; and (e) simultaneously or consecutively leaching the membrane by passing the membrane through one or more zones under conditions such that at least a substantial portion of the solvent and non-solvent for the polyphenylene sulfide is removed from the membrane;

wherein the semi-permeable membrane so formed possesses a microporous structure.

In a preferred embodiment, using a solvent/non-solvent mixture the process includes step (e'), drawing the membrane before, during and/or after the leaching of step (e) at a temperature at or above the ambient temperature and below the melting point of the polyphenylene sulfide or the depressed melting point of the mixture to elongate the membrane and to induce orientation of the polyphenylene sulfide in the membrane, and also to control micropore size.

In a preferred embodiment the process includes at least one of the solvents and at least one of the nonsolvents listed hereinbelow.

In another aspect, the solvent is independently selected from the organic compounds listed below as solvents or mixtures of these compounds.

In one aspect, the present invention relates to a process for the production of a fiber or film which is permselective comprising a polymer itself comprising (poly)phenylene sulfide), which process comprises:

A. contacting poly(phenylene sulfide) with at least one organic compound, consisting essentially of carbon and hydrogen and optionally oxygen, nitrogen, sulfur, halogen, or mixtures of these atoms, said at least one organic compound having a molecular weight of between 160 and 450 daltons and having at least one six membered aromatic ring structure, which compound is a stable liquid at a temperature of between 240 and 400 degrees C. at ambient pressure for a time effective to dissolve greater than about 110% by weight of the poly(phenylene sulfide) present, with the proviso that when oxygen is present, the organic compound is not diphenyl oxide or substituted diphenyl oxide;

B. forming the solution of poly(phenylene sulfide) and the organic compound of Step (A) into a desired article configuration;

C. removing the at least one organic compound; and

D. recovering the article comprising poly(phenylene sulfide) formed thereby.

In another aspect, the present invention relates to the article of manufacture of PPS obtained from the process described herein, particularly where the article is porous, permeable, semi-permeable or selectively permeable.

In another aspect, the present invention relates to a process for the production of an article comprising polymer itself comprising poly(phenylene sulfide), which process comprises:

(A) contacting poly(phenylene sulfide) with:
  (i) a solvent organic compound consisting essentially of carbon and hydrogen and optionally oxygen, nitrogen, sulfur, halogen, or mixtures of these atoms, said at least one organic compound having a molecular weight of between 160 and 450 daltons and having at least one six membered aromatic ring structure, which compound is a stable liquid at a temperature of between about 240 and 400 degrees C. at ambient pressure for a time effective to dissolve greater than about 10% by weight of the poly(phenylene sulfide) present, with the proviso for each organic compound that when oxygen is present the organic compound is not diphenyl oxide or a substituted diphenyl oxide; and, optionally,
  (ii) a nonsolvent compound having the same molecular weight range and temperature stability range as the solvent compound which dissolves less than 5 percent by weight of the PPS.

(B) forming the solution of poly(phenylene sulfide) and the organic compound of Step (A) into a desired article configuration;

(C) removing the at least one organic compound and optional nonsolvent compound; and (D) recovering the article comprising poly(phenylene sulfide) formed thereby.

In another aspect, the present invention relates to the article of manufacture of PPS obtained from the process described herein, particularly where the article is porous, permeable, semi-permeable or selectively permeable.

In a preferred embodiment, the present invention uses at least one organic compound, which is a solid at ambient temperature but which melt when heated above ambient temperature to produce a stable organic liquid or mixture of organic liquids. Usually the organic compound melts at temperature above 80° C. The solid organic compound may be heated and melted separately, and the solid PPS then added and dissolved at temperatures between 160° and 400° C.

The nonsolvent compounds optionally are selected in the same manner as above.

In another preferred embodiment, the solid organic compound and the solid PPS are combined and then heated together as solid until the solid organic compound melts to form a stable liquid. The liquid/solid mixture then is heated between about 160° and 400° C. to solubilize up to about 50% or greater by weight of the PPS.

BRIEF DESCRIPTION OF THE FIGURES

FIG. 1(A) is a schematic representation of a single drum membrane casting process.

FIG. 1(B) is a schematic representation of double drum membrane casting process using nip rolls.

FIG. 2(A) is a schematic representation of a single drum liquid (water) quench membrane casting process.

FIG. 2(B) is a schematic representation of a double drum liquid (water) quench membrane casting process.

FIG. 3 is a graph of the effect of cooling condition on the nitrogen permeability of a 30% PPS/CLTA membrane cast on an aluminum plate.

FIG. 4 is a scanning electron micrograph (5000×) of a 30% PPS/e-CLTA membrane showing liquid-solid phase separation and resultant nodular bulk porosity structure.

FIG. 5 is a scanning electron micrograph (5000×) of a 30/70 PPS/diphenylsulfone (DPS) membrane showing liquid-liquid phase separation and resultant cellular bulk porosity structure.

FIG. 6 is an illustration of qualitative test to evaluate the ability of the membrane to undergo stress.

FIG. 7 is a graphic representation of the nitrogen gas permeability of PPS/DPS extruded film membrane as a function of the quench temperature.

FIG. 8 is a graphic representation of the nitrogen gas permeability of PPS/DPS as a film membrane as a function of the quench temperature.

FIG. 9 is a graphic representation of the water flux permeability of PPS/DPS binary blend as a film membrane as a function of the quench temperature.

FIG. 10 is a graphic representation of the water permeability of PPS membranes from PPS/DPIP as a function of the quench temperature.

FIG. 11 is graphic representation of water permeability of PPS/DPIP as a function of the quench temperature.

FIG. 12 is a scanning electron micrograph of a PPS membrane as produced in Example 14. The scale is that of 1 cm =0.89 micron.

DETAILED DESCRIPTION OF THE INVENTION AND PREFERRED EMBODIMENTS

Definitions

As used herein:

"Article" refers to any type of article of manufacture which can be formed from a polymeric material. Preferably, the article is a sheet, film membrane, hollow tube, hollow or solid fiber. These articles, when permeable, semipermeable, permselective or selectively permeable, can be used in the separation of various materials. The potential utility of such a membrane article depends upon the membrane material, its structure (which depends upon its mode of preparation), and the mode in which it is operated. For example, such articles can be used to permeate gasses, e.g. oxygen or nitrogen, to separate solutes of suspended matter from solutions, e.g. soluble waste materials from blood (hemodialysis) or to separate dissolved molecules, colloids, and suspended solids from smaller molecules, e.g., in the manufacture of latex or cheese (ultrafiltration). Such membranes, their mechanisms of transport and preparation, their structures, and examples are discussed at length in many references. The following four discussions are herein incorporated as references with the additional references therein: (a) "Membrane Technology," by D. R. Paul and G. Morel in "Kirk-Othmer Encyclopedia of Chemical Technology," M. Grayson, and D. Eckroth, (eds), John Wiley & Sons, New York, 3rd ed., Volume 15, pages 92-131 (1981); (b) "Ultrafiltration," by P. R. Klikowski, ibid., volume 23, pages 439-461 (1983); (c) "Synthetic Polymeric Membranes, A Structural Perspective," by R. E. Kesting, John Wiley & Sons, New York, 2nd edition, 1985; and (d) "Materials Science of Synthetic Membranes," D. R. Lloyd, editor, American Chemical Society, Washington, D.C., ACS Symposium Series No. 269, (1985).

"Forming the article" refers to the shaping of the hot pliable poly(phenylene sulfide)/solvent (organic compound) mixture or the hot pliable-PPS/solvent/nonsolvent (organic compound) mixture or the hot pliable PPS/solvent/nonsolvent mixture into a desired article configuration. The forming may be accomplished by extruding, pressure molding, solvent casting blow molding, or any of the convention methods used in the art to shape a flexible polymer.

"Halogen" refers to fluorine, chlorine, bromine, iodine or mixtures of these atoms, generally as is found in a substitute in an organic molecule. Generally, bromine and/or fluorine as atoms are preferred.

"Nonsolvent" refers to an organic compound as described in Table 1 which dissolves less than about 5 percent by weight of the polymer PPS at a specific temperature about 100° C. Non-solvent organic compounds for PPS include, for example, those compounds independently selected from the group consisting of 1,3,5-triphenylbenzene, tetra-phenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphos-phoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, 4,4'-dihydroxybenzo-phenone, or mixtures thereof.

"Optionally" refers to a step in a process which may or may not be performed, or to a component which may or may not be present.

"Organic compound" refers to those organic materials consisting of carbon and hydrogen having a molecular weight of between about 160 and 450 daltons and usually having at least one six membered aromatic ring structure. This includes organic compounds such as triphenylmethane, fluoranthene, pyrene and the like. It also includes those compounds which further include oxygen, nitrogen, sulfur, halogen or mixtures of these atoms. Heteroaromatic compounds having molecular weights of between about 160 and 450 daltons are included. An organic compound which is useful in the present invention as a solvent will dissolve greater than about 10% by weight of the PPS-type polymer. A poor solvent is an organic compound as described herein in Table 1 below which dissolves between 5 and 10 percent by weight of the PPS polymer at a specific temperature above 100 degrees C.

The instant invention includes solvents for PPS that may be readily removed from such mixtures by treatment with other more conventional organic solvents that dissolve the solvent for PPS, but do not dissolve the PPS. The instant invention also discloses solvents for PPS that may be removed from such mixtures by water or by aqueous alkali; such water or aqueous alkali-soluble solvents are desired in processing, because they allow the use of less flammable, more inexpensive, and less potentially hazardous or toxic leach processes.

"Phenyl" or "phenylene" refers to the following structures:

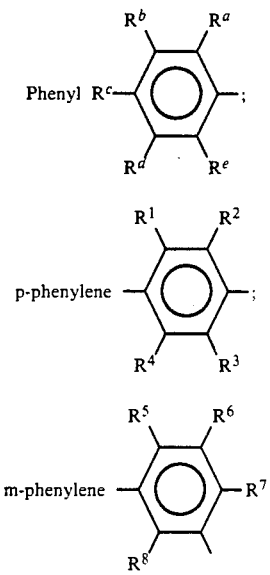

wherein $R^a$, $R^b$, $R^c$, $R^d$, $R^3$, and $R^1$ to $R^8$ are each independently selected from hydrogen, methyl, ethyl, propyl, butyl, fluorine, chlorine or bromine.

"Organic compound" refers to those high boiling organic compounds as solvents for PPS (preferably which are solids at ambient temperature and pressure and usually do not melt lower than about 50° C.). The solvents include, for example, those independently selected from the group consisting of 4,4'-dibromobiphenyl; 1-phenyl-naphthalene; phenothiazine;2,5-diphenyl-1,3,4-oxadiazole;2,5-diphenyloxazole; triphenylmethanol; N,N-diphenylformamide; m-terphenyl; benzil; anthracene; 4-benzoylbiphenyl; dibenzoylmethane; 2-biphenyl-carboxylic acid; dibenzothiophene; pentachlorophenol; benzophenone; 1-benzyl-2-pyrrolidione; 9-fluorenone; 2-benzoyl-naphthalene; 1-bromonaphthalene; diphenyl sulfide; 1,3-diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromo-biphenyl; 2-phenylphenol; thian-threne; 4,4-diphenylbenzo-phenone; 3-phenoxybenzyl alcohol; 4-phenylphenol; 9,10-dichloroanthracene; p-terphenyl; 2-phenoxybiphenyl; triphenyl-methane; 4,4'-dimethoxybenzophenone; 9,10-diphenylanthracene; fluoranthene; diphenyl sulfone; diphenyl phthalate; diphenyl- carbonate; 2,6-dimethoxynaphthalene; 2,7-dimethoxynaphthalene; 4-bromodiphenyl ether; pyrene; 9,9'-bi-fluorene; 4,4'-isopropyl-lidenediphenol; 2,4,6-trichlorophenol, epsilon-caprolactam, N-cyclohexyl-2-pyrrolidone, diphenyl- isophthalate, diphenylterphthalate, or mixtures of these compounds.

These structures may be found as part of the PPS, PPS-like, and PPS-type polymer structures described herein. Thus, a poly(phenylene sulfide)-type structure may have as a structure poly(2-chlorophenylene sulfide) or poly (2-methylphenylene sulfide). Usually, the p-phenylene is preferred wherein at least two groups of $R^1$ to $R^4$ are hydrogen and the other two groups are each independently selected from methyl, ethyl, propyl, butyl, fluorine, chlorine or bromine. Especially preferred is p-phenylene where three of the groups $R^1$ to $R^4$ are hydrogen and the remaining group is independently selected from methyl, ethyl, propyl, butyl, fluorine, chlorine or bromine.

The method of combining the crystalline polymer with the organic compound(s) as a solvent (solubilizing agent) medium, this includes solvent/nonsolvent mixtures, it is not critical to the process of the present invention. The combination may be conveniently prepared by mixing, stirring, extrusion, gear pumps, rotary mixers, static mixers, or other means well known in polymer, membrane, and mixing technologies.

The pressure and composition of the atmosphere above and on the polymer (PPS) and organic compound in the practice of this invention is not critical. Generally ambient pressure is used. In some cases, above atmospheric pressure is possible, particularly if higher temperatures than the boiling point of the organic compound is desired. Preferably, the atmosphere above the polymer and organic compound is essentially inserted to prevent undesirable side reactions of any of the components. Nitrogen is suitable inert atmosphere.

The dissolution of PPS in a given solvent is a function of the polymer concentration and the temperature. Solubility curves for thirteen typical solvents for PPS have been performed: m-terphenyl, 4-phenylphenol, and diphenylsulfone; anthracene, benzopheneone, and 2-phenylphenol; 1-cyclohexyl-2-pyrrolidonone, o,o'-bipheno and epsilon-caprolactam (e-caprolactam); benzil and 9-fluorenone; and pyrene and fluoranthene, respectively. Any temperature-concentration combination above each curve represents a homogenous one phase composition; any combination below each curve, a multiphase mixture in which the polymer is not completely soluble. Thus, as described in U.S. Ser. No. 329,666, for example, a mixture of 50% PPS in 4-phenylphenol requires a temperature in excess of about 257 degrees C. for complete dissolution to be achieved. Similarly, 40% PPS in anthracene requires a temperature in excess of about 243 degrees C. for complete solubility to occur.

It is useful to prepare films, fibers, tubes and the like of PPS using a mixture of an organic compound as a solvent in combination with a nonsolvent or a poor solvent. Thus, if a solvent and a nonsolvent are combined at an elevated temperature and are soluble in each other, when the PPS is added, the PPS may be dissolved. The solvent/non-solvent combination is extremely useful in the production of porous permselective membranes of PPS. Typically, a solution for preparing hollow fiber membranes might consist of about 50 weight percent PPS with the remainder consisting of the solvent, solvent/nonsolvent, or solvent/poor solvent mixture. The ratio of solvent to nonsolvent, or solvent to poor solvent typically might vary from about 1.5/1 to about 20/1 depending upon the relative solvent power of the solvent and the nonsolvent or poor solvent.

It is to be understood that various materials, such as fillers, additives, antioxidants, pigments, dyes, inhibitors and the like can be dissolved or dispersed with the PPS solubilized by the practice of this invention. These materials are present to improve the processing or to provide specific physical and/or chemical properties of the final polymer article. Such materials are described for example in detail, by R. Gachter and H. Muller in "Plastics Additives Handbook," 2nd edition, published by Hanser Publishers, Munich, in 983, which is incorporated herein by reference.

The organic compounds or mixtures thereof are essentially inert to the PPS at elevated temperatures. The article, e.g. film or fiber, of PPS obtained should be essentially the same composition as the starting PPS.

In another aspect, the article of PPS will contain trace quantities of the organic compound(s) used as solvents (and nonsolvents). These traces will prove useful in determining whether or not the solvents of this present invention have been used for the PPS article of manufacture.

Generally, the polymer/solvent mixture is shaped into a hollow fiber by techniques well known in the art. Such techniques are described by Israel Cabasso in "Hollow Fiber Membranes" in *Kirk-Othmer "Encyclopedia of Chemical Technology,"* Volume 12, pages 492–517, John Wiley and Sons, New York, 3rd edition, (1980), M. Grayson and D. Eckroth, editors.

The solvent/polymer mixture may also be solvent cast on a flat surface, the solvent is removed by evaporation and/or reduced pressure or by using a liquid which dissolves the solvents but not the polymer. The membrane which typically has a thickness of between about 0.2 and 50.0 mils is porous and is useful in separation devises, such as for ultrafiltration, microfiltration, and as microporous supports in composite membranes for gas or liquid separation.

The importance of the rate of cooling is critical to obtain membrane physical properties. This is true for hollow fiber and film membrane fabrication. Also, the effects of solvent flash off during fabrication and the resulting skin formation on membrane properties is critical. For film extrusion, processes such as those shown below may be used. A series of experimental processes was conducted.

In addition to the rate of cooling, the type of phase separation of the polymer-solvent mixture is important in determining the final bulk structure of the hollow fiber or film membrane. The type of phase separation can be either liquid-solid (L-S) leading to a nodular (N) structure, or a liquid-liquid (L-L) phase separation leading to a finer cellular (C) bulk structure (see FIGS. 4 and 5). The type of phase separation obtained is dependent upon the polymer concentration, solvent character, and rate of cooling. Neither a nodular (N) or cellular (C) structure is in all cases preferable, but the preference is determined by the end use of the membrane. The following are some scanning electron micrographs (SEM) indicating the appearance of nodular (N) and cellular (C) bulk structure.

It is known in the art as shown in FIG. 1(A) to melt cast a hot polymer/solvent (11) through a die (12) onto a rotating drum (13) in air which is usually heated to a predetermined temperature. The cooled membrane (14) is then taken from the other end of the drum. This process of FIG. 1(A) results in polymer membranes similar to those cast in air on a hot flat surface and then cooled.

In FIG. 1(B) is shown a process to produce an air melt cast and quenched membrane. Again, the polymer/solvent 11 is melt cast through a die 12 onto drum 15 and drum 16. The rotating drums can be each at the same predetermined temperature or more likely are at different temperatures. The formed polymer membrane (17) is taken from the circular surface of drum 15. The process of FIG. 1(B) results in a polymer membrane that is similar in properties to one cast in air between two heated metal plates.

FIG. 2(A) is similar to FIG. 1(A) except that the polymer is quenched in a liquid and optionally the solvent is leached into the liquid. Alternatively, the leach liquid can be in another container. The molten polymer/solvent/optional nonsolvent 21 is extruded through die 22 to shape the hot polymer/solvent 23. Drum 24 is rotating and the formed membrane is quenched (and optionally concurrently drawn) between rotating drum 24 and drums 25 and 26.

FIG. 2(B) is similar to FIG. 1(B) except that the polymer is quenched in a liquid and (optionally leached at the same time). The molten polymer/solvent and/or non-solvent 21 is extruded through a die 22 to produce a shaped membrane film. The hot film passes between rotating drums 27 and 28 which further shapes the membrane to desired dimension. The membrane is then quenched in liquid 29 (e.g. water) and optionally can be drawn (elongated) at the same time using rotating drum 30 and drum 31.

The following description follows the process of poly(etheretherketone) (PEEK) described in U.S. Pat. No. 4,904,426, which is specifically incorporated by reference. The PEEK is replaced by about an equivalent weight of PPS.

The selection of the components for the extrusion blend is dependent upon whether a non-interconnecting or interconnecting porous structure or permselective is desired. For use in fiber or film reinforced composites, the fibers or films may possess either a non-interconnecting or an interconnecting porous structure. In a non-interconnecting porous structure, the pores within the membrane are not completely interconnected so that the pores do not directly connect one side of the membrane with the other side of the membrane, although fluid flow through the membrane may still be accomplished by solution-diffusion transport of the fluid through the dense polymer regions of the membrane.

In an interconnecting porous structure, the pores are completely interconnected so that the pores directly connect one side of the membrane with the other side of the membrane so that fluid flow through the membrane may be accomplished primarily by transport through the membrane's pores.

The factors which determine the formation of interconnecting versus non-interconnecting pores include the polymer concentration in the extrusion blend, volatility of the solvent, cooling rate of the nascent fiber or film, and composition of non-solvent in the extrusion blend. The formation of fibers with non-interconnecting pores preferably uses an extrusion blend containing polymer and solvent. The formation of fibers with interconnecting pores preferably uses an extrusion blend containing polymer, solvent and non-solvent.

The concentration of the components in the extrusion mixture may vary and are dependent upon the desired type of pore structure (interconnecting versus non-interconnecting pores), porosity, and pore size of the fibers. The concentration of poly(phenylsulfide) polymer-type in the extrusion mixture is that which results in a mixture with a suitable viscosity for extrusion at the extrusion temperature. The viscosity of the mixture must not be so high that the fluid is too viscous to extrude or cast; the viscosity must not be too low such that the fluid cannot maintain its desired shape upon exiting the extrusion die. Extrusion blends of PPS polymers generally possess non-Newtonian viscosity behavior; therefore, such blends exhibit a shear rate dependence upon viscosity. The mixture preferably has a viscosity at extrusion temperatures of between about 100 and 10,000 poise at a shear rate from about 10 to 10,000 sec$^{-1}$, more preferably between about 300 and 1,000 poise at a shear rate of from about 50 to 1,000 sec$^{-1}$. In the case of non-interconnecting porous structures, the concentration of PPS polymer is preferably from about 10 to about 90 wt %, more preferably from about 20 to 80 wt %. In the case of an interconnecting porous structure, the concentration of poly(phenylene sulfide)-type polymer is preferably from about 20 to about 70 wt %, more preferably from about 30 to 65 wt %. The concentration of the solvent is preferably from about 1 to about 90 wt %, more preferably from about 2 to about 80 wt %. The concentration of the optional nonsolvent is preferably from about 0 to about 90 wt %, more preferably from about 0 to about 80 wt %. When a nonsolvent is used, the solvent/non-solvent ratio is preferably from about 0.05 to 24, more preferably from about 0.1 to 12.

The fibers or films are extruded or cast from the poly(phenylene sulfide) polymer compositions hereinbefore described. The components of the extrusion mixture may be combined prior to extrusion by mixing in any convenient manner with conventional mixing equipment, as for example, in a Hobart mixer. The extrusion blend may also be combined and mixed under heating in a resin kettle. Alternatively, the extrusion composition may be homogenized by extruding the mixture through a twin screw extruder, cooling the extrudate, and grinding or pelletizing the extrudate to a particle size readily fed to a single or twin screw extruder. Alternatively, the components of the extrusion composition may be combined directly in a melt-pot or twin screw extruder and extruded into fibers in a single step. The use of static mixers helps to ensure blend homogeneity.

The mixture is heated to a temperature which results in a homogeneous fluid possessing a viscosity suitable for extrusion. The temperature should not be so high or the exposure time so long as to cause significant degradation of the PPS polymer, solvents and optional nonsolvents. The temperature should not be so low as to render the fluid too viscous to extrude. The extrusion temperature is preferably between about 170° and 400° C., more preferably between about 275° and 350° C.

The mixture of polymer, solvent, and optional nonsolvent is extruded through a solid fiber or hollow fiber die (spinneret). Solid fibers refer to fibers which are non-hollow. Such solid fiber dies or hollow fiber spinnerets typically are multi-holed and thus produce a tow of multiple fibers. The hollow fiber spinnerets include a means for supplying fluid to the core of the extrudate. The core fluid is used to prevent the collapsing of the hollow fibers as they exit the spinneret. The core fluid may be a gas such as nitrogen, air, carbon dioxide, or other inert gas or a liquid which is non-solvent for the PPS polymer such as dioctyl phthalate, methyl stearate, polyglycol, mineral oil, paraffin oil, petroleum oil, for example, MOBILTHERM ® 600, 603, and 605 heat transfer oils (®Trademarks of Mobil Oil Corporation of Cleveland, Ohio), and silicone oil, for example, DC-704® and DC-710® silicone oil (®Trademarks of Dow-Corning Corporation of Midland, Mich.). Use of a liquid non-solvent as the core fluid may result in a microporous membrane with an inside skin. A solvent and non-solvent core fluid mixture may be used to control the inside skin morphology.

The extrudate exiting the die enters one or more quench zones. The environment of the quench zone may be gaseous or liquid. Within the quench zone, the extrudate is subjected to cooling to cause solidification of the fibers with the optional simultaneous removal of a portion of the solvent and optional non-solvent. In a preferred embodiment, the fibers are initially quenched in a gaseous environment such as air, nitrogen, or other inert gas. The temperature of the gaseous quench zone is preferably in the range from about 0° to about 100° C., more preferably in the range from about 10° to about 40° C. The residence time in the gaseous quench zone is preferably less than about 120 sec, more preferably less than about 30 sec. Shrouds may be used to help control gaseous flow rates and temperature and profiles in the gaseous quench zone.

In one aspect, the least one organic compound is removed by evaporation, heating, subliming, reduced pressure, use of solvents which dissolve the organic compound (and/or the non-solvent), but do not dissolve PPS, or combinations of these techniques. The formed organic compound PPS article is cooled somewhat, preferably to between about ambient temperature and 100° C., and contacted with one or more removal solvents to remove the organic compound (and/or the non-solvent present) but retain the form of the article of PPS, e.g. fiber, tube or film. Removal solvents include, for example, one or more organic compounds, such as acetone, methylene chloride, dimethylsulfoxide, methanol, ethanol or mixtures thereof, and also water, and aqueous base (5 to 10% NaOH or KOH). Aqueous base is particularly useful to dissolve and remove phenolic organic compounds. In another embodiment, the organic compound/PPS article is cooled to about 150° C. and reduced pressure (about 1 mm and 0.001 microns) is applied to remove the organic compound.

Following or instead of the gaseous quench, the fibers or films may optionally be quenched in a liquid environment which is substantially a non-solvent for the PPS polymer such as water or ethylene glycol and which optionally contains an effective amount of a swelling agent. The maximum temperature of the given liquid is that temperature at which the fiber is not adversely affected. The temperature is preferably between about 0° and about 200° C., more preferably between about 0° and 100° C. The residence time in the liquid quench zone is preferably less than about 120 sec, more preferably less than 30 sec.

Following quenching, the fibers may be passed through one or more leach baths to remove at least a portion of the solvent and/or optional non-solvent. The leach bath need not remove all of the solvent and/or non-solvent from the fibers. Preferably, the leach bath removes the solvent and/or non-solvent to a level of less than about 2.0 wt % in the leached fiber. The leach bath is comprised of a solution which is a non-solvent for the PPS polymer but which is a solvent for the extrusion solvent and/or non-solvent. Preferred leach liquids include toluene, xylene, acetone, chlorinated hydrocarbons such as methylene chloride, carbon tetrachloride, trichloroethylene, and 1,1,1-trichloro-ethane. The maximum temperature is that temperature at which solvent and/or non-solvent removal from the fibers occurs at a reasonable rate. The temperature of the leach bath is preferably between about 0° and about 200° C., more preferably between about 0° and 80° C. The residence time in the leach bath is preferably less than about 14 hr, more preferably less than about 1 hr.

The fibers may drawn down using conventional godet equipment to the appropriate size. Drawing may occur before, during or after leaching. Line speeds are not critical and may vary significantly. Typical line speeds range from about 30 ft/min to about 300 ft/min. In the case of hollow fibers used in membrane applications, the fibers preferably possess an outside diameter of from about 50 to about 3,000 microns, more preferably of from about 80 to about 2,000 microns with a wall thickness of preferably from about 10 to about 400 microns, more preferably from about 20 to about 400 microns. In the case of fibers used in fiber reinforced composites, the fibers preferably possess an outer diameter of from about 5 to 100 microns, more preferably from about 5 to about 50 microns; optionally the fibers may be hollow with a wall thickness preferably of from about 2 to about 45 microns, more preferably from about 2 to 20 microns.

Following leaching, the fibers are dried. Prior to drying, the leach liquid remaining in the fibers may optionally be exchanged with more volatile, non-polar drying agent which possesses a low surface tension and is a solvent for the leach liquid, but a non-solvent for the polymer, in order to reduce the possibility of pore collapse during drying. Preferred drying agents include trademark of E.I. duPont de Nemours Co., Inc., of Wilmington, Del.). The exchange may be carried out at temperatures which do not adversely affect the membrane, preferably from between about 0° to about 45° C. The fibers may be dried in air or an inert gas such as nitrogen. Drying may also be done under reduced pressures. The fibers may be dried at temperatures at which drying takes place at a reasonable rate and which do not adversely affect the membrane. The drying temperature is preferably between about 0° and about 140° C., more preferably between about 10° and 80° C. The drying time is preferably less than about 24 hr, more preferably less than about 6 hr.

The microporous fibers or films of this invention may be characterized by their porosity and pore size. Porosity refers to the volumetric void volume of the fibers. Porosity is defined as $100 \times [1-(d_f/d_{pps}]$ where $d_f$ is the density of the final leached fiber or film and $d_{pps}$ is the density of the PPS polymer. The fibers or films of this invention which possess non-interconnecting pores preferably have a porosity of between about 10 and 90 percent, more preferably between about 20 and about 80%. Fibers of this invention which possess interconnecting pores preferably have a porosity of between about 20 and about 70%, more preferably between about 30 and about 65%. Pore size may be estimated by several techniques, including be scanning electron microscopy and/or measurement of bubble point, solvent flux, and molecular weight cutoff. Such techniques are known in the art for characterizing the pore size of microporous membranes, see, for example, Robert Kesting, *Synthetic Polymeric Membranes*, 2nd edition, John Wiley & Sons, New York, 1985, pp. 46-56; Channing R. Robertson (Stanford University), *Molecular and Macromolecular Sieving by Asymmetric Ultrafiltration Membranes*, OWRT Report, NTIS No. PB85-1577661EAR, September, 1984; and ASTM Test Method F316-86, which are incorporated herein by reference. The pore size is preferably between about $1 \times 10^{-3}$ microns to about 3.0 microns, more preferably between about $3 \times 10^{-3}$ microns to about 1.0 micron.

In a preferred embodiment of this invention, the process produces microporous hollow fiber or film membranes having interconnecting pores. Such membranes are useful in the treatment of liquids by the membrane separation processes of microfiltration, ultrafiltration, reverse osmosis, pervaporation, and membrane distillation. Such hollow fibers may also be used as porous supports for composite gas or liquid separation membranes. In an especially preferred embodiment, the process produces microporous hollow fiber membranes useful for ultrafiltration or microfiltration. Ultrafiltration and microfiltration are pressure driven filtration processes using microporous membranes in which particles or solutes are separated from solutions. Separation is achieved on the basis of differences in particle size or molecular weight. Membranes of this invention useful in ultrafiltration and microfiltration preferably possess a molecular weight cut off for ultrafiltration of about 10 to 500 Angstroms and a molecular weight cut off for microfiltration of about 0.05 to 7.0 microns. Microfiltration and ultrafiltration may be carried out at temperatures which do not adversely affect the membranes. Operating temperatures preferably range from about 0° to about 130° C. Operating pressures are dependent upon the pore size of the membrane and the particles or solutes being separated from solution. Preferred operating pressures range from about 5 to about 150 psi.

Drawing or Stretching—The drawing, stretching or elongation of the membrane in a uniaxial or a biaxial mode is described in U.S. Serial No. 380,058, filed Jul. 14, 1989 for PEEK which is specifically incorporated by reference. The PEEK is replaced by PPS. Also the following can be used.

Before, during and/or after leaching, the membranes may be drawn down or elongated to the appropriate size and thickness. Drawing down or elongating means the membranes are stretched such that the length of the membrane is longer and the diameter is smaller at the end of the drawing or elongation process. Drawing increases the mechanical strength of the membrane by inducing orientation in the membrane. The draw temperature is dependent upon whether the membrane contains solvent and optimal nonsolvent at the time of drawing. For substantially solvent and optional non-solvent free membranes, the membrane is heated to a temperature between the glass transition temperature of PPS and the melting point of PPS, with preferred lower temperatures being at least about 90° C., more preferably at least about 100° C., and with preferred upper temperatures being less than about 280° C., more preferably less than about 270° C. For membranes containing solvent and optional non-solvent, the membrane is heated to a temperature between ambient temperature and the melting point of PPS or the depressed melting point of PPS/solvent/optional non-solvent mixture, with preferred lower temperatures being at least about 10° C. below the depressed melting point. The membrane is drawn by stretching the membrane under tension. Flat sheet membranes may be uniaxially or biaxially drawn. Uniaxial drawing or orientation is generally performed by running the membranes over a pair of godets in which the latter godets are moving at a faster rate than the former godets. The draw down elongation ratio is the ratio of the beginning length of the membrane of the final length of the membrane. Preferably the lower limit on the draw dow or elongation ratio is about 1.05, more preferably 1.1. Preferably the upper limit on the draw down or elongation ratio is about 1.05, more preferably 1.1. Preferably the upper limit on the draw down or elongation ratio is about 10. The membrane may be drawn in one or more stage with the options of using different temperatures, draw rates, and draw ratios in each stage. Line speeds are generally not critical and may vary significantly. Practical minimum preferred line speeds are at least about 10 ft/min, are preferably at least about 30 ft/min. Practical maximum preferred line speeds are less than about 2000 ft/min, more preferably less than about 1000 ft/min.

Biaxial orientation or drawing may be accomplished by techniques known in art such as the tenter frame process, the double bubble method, or the blown film process (see *Encyclopedia of Polymer Science and Engineering*. John Wiley & Sons, New York, Vol. 7, pages 98-102 (1987)). Depending upon the process used the biaxial orientation of drawing may be carried out sequentially or simultaneously. For example, drawing via a tentering operation may be sequential (e.g. transverse orientation may be carried out followed by longitudinal orientation or vice-versa) or both transverse or longitudinal orientation may both be accomplished at the same time (i.e. simultaneously). Orientation by the blown film method would be a simultaneous transverse and longitudinal operation.

Regarding Example 5 etc. below—The creation of asymmetric membranes is usually accomplished by having the rate of phase change different on the two sides of the membrane. This phase change may be coagulation, phase inversion, liquid-liquid phase separation, or liquid-solid phase separation. One of the methods to control this rate of phase change, and therefore control the morphology, pore size, and asymmetry is to contact one side of the hollow fiber and flat membrane with a second liquid. This second liquid may or may not be a solvent for the solvent used to initially dissolve the polymer. An asymmetric flat membrane may be easily visually identified by an examination of the surfaces. The side with smaller pores and less porosity appears shiny compared to a more porous, higher pore size surface. This latter surface appears dull compared to the shiny surface. Therefore, a membrane with one "shiny" (smooth) side, and a "dull" side is by definition asymmetric.

Regarding Examples 12 and 13—The experimental section has a detailed description of these permselective membranes. In Examples 12 and 13, the PPS/solvent/optional nonsolvent are heated 0.5 to 2 hr, preferably about one hr, until the reaction mixture turns dark (but clear). Further heating of 0.2 to 1 hr usually does not result in any further darkening of the reaction mixture. The membranes show good permselective and tensile properties.

In one aspect, the microporous fiber or membrane described have hydraulic permeability of at least 500 ml/HR-M$^2$·cm Hg or greater.

In one aspect, the microporous fiber or membrane described have a gas flux through the membrane of at least $1 \times 10^{-5}$ cm$^3$/cm$^2$·sec·cm Hg or greater.

In one aspect, the microporous PPS fiber or membrane described have hydraulic permeability of at least 2000 ml/HR-M$^2$·cm Hg.

In one aspect, the microporous PPS fiber or membrane described have a gas flux through the membrane of at least $1 \times 10^{-4}$ cm$^3$/cm$^2$·sec·cm Hg.

In one aspect, the PPS membrane produced for microfiltration using a drawing step has an average effective pore size of 0.05 microns or larger.

In one aspect, the PPS produced for ultrafiltration by the process having a drawing step wherein the effective pore size is less than 0.05 microns.

In one aspect, the solvent is N-cyclohexyl-2-pyrrolidone and in step (b) the homogeneous fluid is heated to an elevated temperature and for a time sufficient to cause the fluid to change color from light to dark (tan) in color.

The following Examples are to be construed as being illustrative only and are not to be interpreted as being limiting in any manner.

EXAMPLE AA

Solubilization of PPS at Various Temperatures

"Poly(phenylene sulfide)," or "PPS" refers to a polymeric material which comprises poly(phenylene sulfide). Usually this polymer is prepared from p-dichlorobenzene and sodium sulfide or obtained from Phillips Petroleum Co. Bartlesville, Okla. or Aldrich Chemical Company (or as described).

The PPS designated lot #1726CJ from Aldrich Chemical Company was used as received for solubility determinations. Most of the organic compounds examined as high temperature solvents are obtained from Aldrich Chemical Company and are used as received. Other organic chemicals are obtained from suppliers as listed in Chemical Sources U.S.A., published annually by Directories Publishing Co., Inc., of Boca Ratan, Fla.

Mixtures of PPS and solvent, a total weight of less than 2g, are prepared by weighing PPS and solvent to a precision of 0.001 g in a 1 to 4 dram size glass vial. The resulting air space in each vial, which varies considerably due to the large differences in the bulk densities of the compounds, is purged with nitrogen. The vials are sealed with screw caps containing aluminum foil liners.

Solubility is determined usually at about 10 weight percent polymer, followed by additional determinations at about 25 and 50 weight percent if necessary.

Table 1 below lists the organic compounds examined for their solvent effect on PPS. The approximate solubility of each polymer is shown at the indicated temperature(s). The organic compounds were assigned a number (beginning with 200) for easy reference. Also listed in Table 1 is an approximate molecular weight, melting point, and boiling point, if these physical properties were available. In the Tables, "g" in the solubility column means "greater than," "s" means "smaller than," and = means "equal to."

TABLE 1

RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 200 | Triphenylmethanol | 260 | 161 | 360 | g 50.1%? | 349 |
| 201 | Triphenylmethane | 244 | 93 | 359 | g 50.0% | 349 |
| 202 | Triphenylene | 228 | 196 | 438 | g 49.9% | 350 |
| 203 | 1,2,3-Triphenylbenzene | 306 | 158 | — | g 49.9% | 349 |
| 204 | 1,3,5-Triphenylbenzene | 306 | 173 | 460 | s 10.4% | 349 |
| 205 | Tetraphenylmethane | 320 | 281 | 431 | s 25.2% | 349 |
| 205 | Tetraphenylmethane | 320 | 281 | 431 | =s 50.3%? | 349 |
| 206 | Tetraphenylsilane | 337 | 236 | 422 | s 9.9% | 349 |
| 207 | Diphenyl sulfoxide | 202 | 70 | 350 | s 10.4%a | 349 |
| 208 | Diphenyl sulfone | 218 | 124 | 379 | g 50.0% | 349 |
| 209 | 2,5-Diphenyloxazole | 221 | 72 | 360 | g 50.1% | 349 |
| 210 | Diphenic acid | 242 | 228 | — | s 10.1%a | 349 |
| 211 | 1,1-Diphenylacetone | 210 | 60 | — | g 49.9% | 302 |
| 212 | 1,3-Diphenylacetone | 210 | 33 | 330 | g 49.8% | 302 |
| 213 | 4-Acetylbiphenyl | 196 | 117 | — | =s 8.6% | 302 |
| 214 | 2-Biphenylcarboxylic acid | 198 | 109 | 349 | g 50.2% | 349 |
| 215 | 4-Biphenylcarboxylic acid | 198 | 225 | — | =s 25.7%? | 349 |
| 216 | m-Terphenyl | 230 | 83 | 379 | g 50.2% | 302 |
| 217 | 4-Benzoylbiphenyl | 258 | 100 | 419 | g 50.2% | 349 |
| 217 | 4-Benzoylbiphenyl | 258 | 100 | 419 | s 49.2% | 302 |
| 218 | 4,4'-Diphenylbenzophenone | 334 | — | — | g 50.0% | 302 |
| 219 | 1-Benzoyl-4-piperidone | 203 | 56 | 399 | g 10.2%? | 349 |
| 220 | 2-Benzoylnaphthalene | 232 | 81 | 383 | g 50.5% | 349 |
| 221 | Diphenyl carbonate | 214 | 79 | 301 | g 24.9% | 302 |
| 221 | Diphenyl carbonate | 214 | 79 | 301 | g 50.0%?a | 302 |
| 222 | Bibenzyl | 182 | 51 | 284 | s 10.1% | 274 |
| 223 | Diphenyl methyl phosphate | 264 | — | 389 | s 10.2%a | 349 |
| 224 | 1-Bromonaphthalene | 207 | −1 | 280 | g 50.6% | 274 |
| 225 | N,N-Diphenylformamide | 197 | 71 | 337 | g 50.2% | 302 |
| 226 | 3-Phenoxybenzyl alcohol | 200 | — | 329 | g 50.0% | 302 |
| 227 | Fluoranthene | 202 | 108 | 384 | g 50.0% | 349 |
| 228 | 2-Phenoxybiphenyl | 246 | 49 | 342 | g 50.0% | 302 |
| 229 | Triphenyl phosphate | 326 | 51 | 281 | s 10.3% | 274 |
| 230 | Cyclohexyl phenyl ketone | 188 | 56 | — | =s 10.0% | 302 |
| 231 | 2,5-Diphenyl-1,3,4-oxadiazole | 222 | 139 | 382 | g 50.1% | 349 |
| 232 | 1,4-Dibenzoylbutane | 266 | 107 | — | g 49.8% | 302 |
| 233 | 9-Fluorenone | 180 | 83 | 342 | g 50.4% | 302 |
| 234 | 1,2 Dibenzoyl benzene | 286 | 146 | — | s 50.2%a | 349 |
| 235 | Dibenzoylmethane | 224 | 78 | 360 | g 50.2% | 349 |
| 236 | 2,4,6-Trichlorophenol | 197 | 65 | 246 | g 25.0% | 242 |
| 236 | 2,4,6-Trichlorophenol | 197 | 65 | 246 | s 50.1% | 247 |
| 237 | Benzil | 210 | 94 | 347 | g 50.2% | 302 |
| 238 | p-Terphenyl | 230 | 212 | 389 | g 50.0% | 302 |
| 239 | Anthracene | 178 | 216 | 340 | g 50.2% | 302 |
| 240 | Mineral oil | — | — | 360 | s 10.0% | 349 |
| 241 | Butyl stearate | 341 | — | 343 | s 7.1% | 302 |
| 242 | 9-Phenylanthracene | 254 | 151 | 417 | g 10.0%?a | 349 |
| 243 | 1-Phenylnaphthalene | 204 | — | 324 | g 50.1% | 302 |
| 244 | 4-Phenylphenol | 170 | 166 | 321 | g 50.0% | 302 |
| 245 | 2-Phenylphenol | 170 | 59 | 282 | g 50.0% | 274 |
| 246 | 1-Ethoxynaphthalene | 172 | — | 280 | g 49.8% | 274 |
| 247 | Phenylbenzoate | 198 | 69 | 298 | s 9.8% | 274 |
| 248 | 1-Phenyldecane | 218 | — | 293 | s 10.4% | 274 |
| 249 | 1-Methoxynaphthalene | 158 | — | 269 | g 48.9% | 247 |
| 250 | 2-Methoxynaphthalene | 158 | 74 | 274 | g 24.8% | 242 |
| 250 | 2-Methoxynaphthalene | 158 | 74 | 274 | s 50.0% | 247 |
| 251 | Sulfuric acid, concentrated | 98 | 11 | 340 | 0.0% | 25 |
| 252 | 4-Bromobiphenyl | 233 | 86 | 310 | g 50.0% | 258 |
| 252 | 4-Bromobiphenyl | 233 | 86 | 310 | g 11.3% | 234 |
| 252 | 4-Bromobiphenyl | 233 | 86 | 310 | g 26.9% | 240 |
| 253 | 4-Bromodiphenyl ether | 249 | 18 | 305 | g 24.7% | 243 |
| 253 | 4-Bromodiphenyl ether | 249 | 18 | 305 | g 50.1% | 274 |
| 254 | 1,3-Diphenoxybenzene | 262 | 60 | — | s 11.3% | 255 |
| 254 | 1,3-Diphenoxybenzene | 262 | 60 | — | =s 50.0% | 274 |
| 255 | 1,8-Dichloroanthraquinone | 277 | 202 | — | s 11.5% | 254 |
| 255 | 1,8-Dichloroanthraquinone | 277 | 202 | — | =s 9.7%a | 274 |
| 256 | 9,10-Dichloroanthracene | 247 | 214 | — | g 11.4% | 252 |
| 256 | 9,10-Dichloroanthracene | 247 | 214 | — | g 50.0% | 302 |
| 257 | 4,4'-Dibromobiphenyl | 312 | 170 | 355 | g 11.4% | 234 |
| 257 | 4,4'-Dibromobiphenyl | 312 | 170 | 355 | g 50.1% | 302 |
| 257 | 4,4'-Dibromobiphenyl | 312 | 170 | 355 | s 24.8% | 242 |
| 258 | Benzophenone | 182 | 50 | 305 | g 50.4% | 274 |
| 259 | Polyphosphoric acid | — | — | — | s 4.4%a | 302 |
| 260 | 1-Chloronaphthalene | 162 | −20 | 258 | s 10.0% | 203 |
| 260 | 1-Chloronaphthalene | 162 | −20 | 258 | g 24.3% | 236 |
| 260 | 1-Chloronaphthalene | 162 | −20 | 258 | s 49.8% | 237 |

TABLE 1-continued

RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 261 | Diphenyl ether | 170 | 27 | 259 | =s 9.7% | 247 |
| 262 | 1-Cyclohexyl-2-pyrrolidinone | 167 | — | 302 | s 9.5% | 203 |
| 262 | 1-Cyclohexyl-2-pyrrolidinone | 167 | — | 302 | g 24.6% | 236 |
| 262 | 1-Cyclohexyl-2-pyrrolidinone | 167 | — | 302 | s 50.0% | 237 |
| 262 | 1-Cyclohexyl-2-pyrrolidinone | 167 | — | 302 | g 50.2% | 302 |
| 263 | 1-Benzyl-2-pyrrolidinone | 175 | — | — | s 10.2% | 233 |
| 263 | 1-Benzyl-2-pyrrolidinone | 175 | — | — | g 50.4% | 302 |
| 264 | o,o'-Biphenol | 186 | 109 | 315 | g 49.9% | 302 |
| 265 | HB-40 (hydrogenated terphenyl) (Monsanto Co.) | 244 | — | 325 | g 49.4% | 302 |
| 266 | Dioctyl phthalate | 391 | −50 | 384 | s 10.0% | 349 |
| 267 | 5-Chloro-2-benzoxazolone | 170 | 191 | — | s 10.2%a | 349 |
| 268 | Dibenzothiophene | 184 | 98 | 332 | g 50.3% | 302 |
| 269 | Bis(4-chlorophenyl sulfone) | 287 | 146 | 412 | s 9.9%a | 349 |
| 270 | Diphenyl phthalate | 318 | 75 | — | g 24.8% | 349 |
| 270 | Diphenyl phthalate | 318 | 75 | — | g 50.0%? | 349 |
| 271 | 2,6-Diphenylphenol | 246 | 101 | — | g 49.9% | 349 |
| 272 | Diphenyl sulfide | 186 | −40 | 296 | =s 49.4% | 274 |
| 273 | Diphenyl chlorophosphate | 269 | — | 360 | s 10.0%a | 349 |
| 274 | Fluorene | 166 | 113 | 298 | =s 50.1% | 274 |
| 275 | Phenanthrene | 178 | 100 | 340 | g 49.9% | 302 |
| 276 | Sulfolane | 120 | 27 | 285 | s 10.0% | 274 |
| 277 | Methyl myristate | 242 | 18 | 323 | s 7.4% | 302 |
| 278 | Methyl stearate | 299 | 38 | 358 | s 10.1% | 349 |
| 279 | Phenothiazine | 199 | 182 | 371 | g 50.1% | 349 |
| 280 | Hexadecane | 226 | 19 | 288 | s 10.0% | 274 |
| 281 | Dimethyl phthalate | 194 | 2 | 282 | s 9.6% | 274 |
| 282 | Tetraethylene glycol dimethyl ether | 222 | −30 | 275 | s 9.8% | 242 |
| 283 | Diethylene glycol dibutyl ether | 218 | −60 | 256 | s 9.8% | 242 |
| 284 | Docosane | 311 | 44 | 369 | s 5.2% | 349 |
| 286 | Dotriacontane | 451 | 70 | 476 | s 10.1% | 349 |
| 287 | 2,7-Dimethoxynaphthalene | 188 | 138 | — | g 50.1% | 274 |
| 288 | 2,6-Dimethoxynaphthalene | 188 | 153 | — | g 50.1% | 274 |
| 289 | o-Terphenyl | 230 | 58 | 337 | g 49.9% | 302 |
| 290 | 4,4'-Dimethoxybenzophenone | 242 | 142 | — | g 50.0% | 349 |
| 291 | 9,10-Diphenylanthracene | 330 | 246 | — | g 50.0% | 349 |
| 292 | 1,1-Diphenylethylene | 180 | 6 | 270 | =s 25.1% | 243 |
| 292 | 1,1-Diphenylethylene | 180 | 6 | 270 | s 48.8% | 247 |
| 293 | epsilon-Caprolactam | 113 | 71 | 271 | g 25.1% | 242 |
| 293 | epsilon-Caprolactam | 113 | 71 | 271 | s 50.1% | 247 |
| 294 | Tetraphenylethylene | 332 | 223 | 420 | s 9.8% | 302 |
| 295 | Pentafluorophenol | 184 | 35 | 143 | s 4.6% | 141 |
| 296 | Thianthrene | 216 | 158 | 365 | g 50.0% | 302 |
| 297 | 1-Methyl-2-pyrrolidinone | 99 | −24 | 202 | s 10.0% | 203 |
| 298 | Pentachlorophenol | 266 | 189 | 310 | g 50.3%?a | 302 |
| 299 | Pyrene | 202 | 150 | 404 | g 50.0% | 273 |
| 300 | Benzanthrone | 230 | 169 | — | s 50.0%ab | 323 |
| 301 | 9,9'-Bifluorene | 330 | 247 | — | g 50.1% | 275 |
| 302 | Santowax R (Monsanto) | — | 145 | 364 | g 50.0% | 273 |
| 303 | Therminol 66 (Monsanto Co.) | 240 | — | 340 | g 50.0% | 273 |
| 304 | Therminol 75 (Monsanto Co.) | — | 70 | 385 | g 50.0% | 273 |
| 305 | 1-Phenyl-2-pyrrolidinone | 161 | 68 | 345 | g 50.0% | 273 |
| 306 | 4,4'-Isopropylidenediphenol | 228 | 156 | 402 | s 50.0%ab | 323 |
| 306 | 4,4'-Isopropylidenediphenol | 228 | 156 | 402 | g 24.9%b | 275 |
| 307 | 4,4'-Dihydroxybenzophenone | 214 | 214 | — | s 10.3% | 319 | a = Black or very dark color
b = reacts?

Table 2 below illustrates those organic compounds which dissolve at least 50 weight percent PPS. In Table 2, in the approximate solubility column, "g" represents "greater than" (>), "s" represents "less than" (<), and = represents "equal to".

TABLE 2

ORGANIC COMPOUNDS WHICH DISSOLVE AT LEAST 50 WEIGHT PERCENT OF PPS

| Ref. No. | Compound | Approximate Solub. (g = >; s = <) | Temperature °C |
|---|---|---|---|
| 249 | 1-Methoxynaphthalene | g 48.9% | 247 |
| 265 | HB-40 (hydrogenated terphenyl) | g 49.4% | 302 |
| 246 | 1-Ethoxynaphthalene | g 49.8% | 274 |
| 212 | 1,3-Diphenylacetone | g 49.8% | 302 |

TABLE 2-continued
ORGANIC COMPOUNDS WHICH DISSOLVE AT LEAST 50 WEIGHT PERCENT OF PPS

| Ref. No. | Compound | Approximate Solub. (g = >; s = <) | Temperature °C. |
|---|---|---|---|
| 232 | 1,4-Dibenzoylbutane | g 49.8% | 302 |
| 275 | Phenanthrene | g 49.9% | 302 |
| 253 | 4-Bromodiphenyl ether | g 49.9% | 302 |
| 217 | 4-Benzoylbiphenyl | g 49.9% | 302 |
| 289 | o-Terphenyl | g 49.9% | 302 |
| 211 | 1,1-Diphenylacetone | g 49.9% | 302 |
| 264 | o,o'-Biphenol | g 49.9% | 302 |
| 271 | 2,6-Diphenylphenol | g 49.9% | 349 |
| 203 | 1,2,3-Triphenylbenzene | g 49.9% | 349 |
| 202 | Triphenylene | g 49.9% | 350 |
| 252 | 4-Bromobiphenyl | g 50.0% | 258 |
| 245 | 2-Phenylphenol | g 50.0% | 274 |
| 296 | Thianthrene | g 50.0% | 302 |
| 218 | 4,4'-Diphenyl benzophenone | g 50.0% | 302 |
| 226 | 3-Phenoxybenzyl alcohol | g 50.0% | 302 |
| 244 | 4-Phenylphenol | g 50.0% | 302 |
| 256 | 9,10-Dichloroanthracene | g 50.0% | 302 |
| 238 | p-Terphenyl | g 50.0% | 302 |
| 228 | 2-Phenoxybiphenyl | g 50.0% | 302 |
| 201 | Triphenylmethane | g 50.0% | 349 |
| 290 | 4,4'-dimethoxybenzophenone | g 50.0% | 349 |
| 291 | 9,10-Diphenylanthracene | g 50.0% | 349 |
| 227 | Fluoroanthene | g 50.0% | 349 |
| 208 | Diphenyl sulfone | g 50.0% | 349 |
| 270 | Diphenyl phthalate | g 50.0% | 349 |
| 221 | Diphenyl carbonate | g 50.0%?a | 302 |
| 288 | 2,6-Dimethoxynaphthalene | g 50.0% | 274 |
| 287 | 2,7-Dimethoxynaphthalene | g 50.0% | 274 |
| 253 | 4-Bromodiphenyl ether | g 50.1% | 274 |
| 257 | 4,4'-Dibromobiphenyl | g 50.1% | 302 |
| 243 | 1-Phenylnaphthalene | g 50.1% | 302 |
| 279 | Phenothiazine | g 50.1% | 349 |
| 231 | 2,5-Diphenyl-1,3,4-oxadiazole | g 50.1% | 349 |
| 209 | 2,5-Diphenyloxazole | g 50.1% | 349 |
| 200 | Triphenylmethanol | g 50.1%? | 349 |
| 262 | 1-Cyclohexyl-2-pyrrolidinone | g 50.2% | 302 |
| 225 | N,N-Diphenylformamide | g 50.2% | 302 |
| 216 | m-Terphenyl | g 50.2% | 302 |
| 237 | Benzil | g 50.2% | 302 |
| 239 | Anthracene | g 50.2% | 302 |
| 257 | 4,4'-Dibromobiphenyl | g 50.2% | 349 |
| 217 | 4-Benzoylbiphenyl | g 50.2% | 349 |
| 235 | Dibenzoylmethane | g 50.2% | 349 |
| 214 | 2-Biphenylcarboxylic acid | g 50.2% | 349 |
| 268 | Dibenzothiophene | g 50.3% | 302 |
| 298 | Pentachlorophenol | g 50.3%?a | 302 |
| 258 | Benzophenone | g 50.4% | 274 |
| 263 | 1-Benzyl-2-pyrrolidinone | g 50.4% | 302 |
| 233 | 9-Fluorenone | g 50.4% | 302 |
| 220 | 2-Benzoylnaphthalene | g 50.5% | 349 |
| 224 | 1-Bromonaphthalene | g 50.6% | 274 |
| 272 | Diphenyl sulfide | =s 49.4% | 274 |
| 254 | 1,3-Diphenoxybenzene | =s 50.0% | 274 |
| 274 | Fluorene | =s 50.1% | 274 |
| 205 | Tetraphenylmethane | =s 50.3%? | 349 |
| 299 | Pyrene | g 50.0% | 273 |
| 301 | 9,9'-Bifluorene | g 50.1% | 275 |
| 305 | 1-Phenyl-2-pyrrolidinone | g 50.0% | 273 |
| 302 | Santowax ® (Monsanto Co.) (Chem. Abstracts #26140-60-3) | g 50.0% | 273 |
| 303 | Therminol 66 (Monsanto Co.) (Chem. Abstracts #61788-32-7) | g 50.0% | 273 |
| 304 | Therminol 75 (Monsanto Co.) (Chem. Abstracts #26140-60-3 and 217-59-4 mixture) | g 50.0% | 273 |

EXAMPLE BB

Solution of PPS in a Solvent/Nonsolvent Mixture (a) Similarly as is described above in Example 1 for the solution of PPS is repeated, except that the solvent is replaced by a solvent/nonsolvent mixture. For example, solutions consisting of (a) PPS (50%), anthracene solvent (32%), and 1,3,5-triphenylbenzene nonsolvent (18%) or (b) PPS (40%), 4-phenylphenol solvent (35%), and sulfolane nonsolvent (15%) may be cast at elevated temperatures on a flat surface. The solvent/nonsolvent mixtures may be removed with solvents such as toluene, methylene chloride, and, in the case of (b) with aqueous potassium hydroxide to produce a porous membrane having a thickness of about 20 mils.

The polyphenylene sulfide (PPS) used in the following Examples was obtained from the HOECHST Celanese Corporation of Chatham, N.J., and was FORTRON ® grade 300. The viscosity of this polymer is approximately 7,000 poise at 300° C. The melting point of the polymer, as measured by differential scanning calorimetry (DSC) was found to be 281° C.

EXAMPLE 1

Viscosity and Depressed Melting Point of Concentrated Solutions of PPS in e-Caprolactum (A) The PPS and water soluble e-caprolactram were weighed into a two-liter resin kettle equipped with a mechanical stirrer, and fitted with a heating mantle. The weight % PPS in the mixture was 50%. The mixture was heated to 260° C. under a nitrogen atmosphere to effect complete dissolution. The homogeneous mixture was then cooled. A portion of the mixture was transferred to a heated Brookfield Viscometer, model RVT, equipped with a No. 4C spindle. The viscosity at several temperatures was recorded at 20 RPM spindle speed, see below.

| Temp °C. | Viscosity (poise) |
|---|---|
| 260 | 24 |
| 250 | 29 |
| 240 | 32 |
| 230 | 38 |

(B) Solutions of PPS and diphenylsulfone (DPS) were prepared in a manner similar to that of Example 1 (A), and heating to 290° C. The cooled polymer-solvent mixtures were examined by DSC to determine the degree of melting point depression of the PPS, see below:

| % PPS | DPS % | TM °C. |
|---|---|---|
| 40 | 60 | 252 |
| 60 | 40 | 257 |

A sample of 40% PPS in diphenylsulfone did not recrystallize in the DSC until a temperature of 207° C. was reached. This indicated that membranes of PPS and solvents could be prepared at temperatures below the depressed melting point of the PPS.

A mixture PPS and the aqueous alkaline soluble 4phenylplenol was prepared in a manner similar to that of Example 1 (A) and heating to 270° C. the concentration of PPS in the mixture was 50%. The blend exhibited a depressed melting point of approximately 264° C.

EXAMPLE 2

Membranes from PPS and Diphenylsilfone (DPS)

A mixture of 30% PPS and diphenylsulfone was prepared in a 2 oz. bottle, and the bottle placed in an air oven at 290° C. for approximately 40 minutes.

The solution, at 290° C., was then cast onto a preheated metal plate. The casting was immediately covered by a second metal plate. The composite was allowed to cool to warm on a heated aluminum block. While still warm, the top metal plate was removed, and a disk cut from the PPS/DPS film. The membrane was leached in acetone for one hour and then dried. The permeability and pore size of the membrane was then determined. The final thickness of the membrane was approximately 10 mil.

Flux of nitrogen = $F\ N_2 = 42 \times 10^{-2}$ cc/cm$^2$·sec·cmHg

Flux of water = $F\ H_2O = 11 \times 10^4$ ml/HR·M$^2$·cmHg
Mean pore size = 0.154 micron
Max pore size = 0.298 micron.

As can be seen from FIG. 3, as the temperature of the aluminum plate used for casting the PPS increases, the nitrogen permeability of the final quenched membrane increases. The effect is most striking in the experimental condition where solvent is lost by solvent flash during the process. The type of process with solvent flash can be very important in the preparation of assymetric membranes. For example, similar to the alternative processes shown in FIGS. 1(A) or 1(B).

FIG. 4 shows the type of nodular bulk structure from liquid solid phase separation.

FIG. 5 shows the type of cellular bulk structure from liquid-liquid phase separation.

The process to produce a nodular bulk structure in FIG. 4 or a cellular structure in FIG. 5 depends upon the desired application of the final membrane. It is possible using the present process to tailor these membranes accordingly.

EXAMPLE 3

Membranes from PPS and the Water Soluble e-Caprolactam

A membrane was prepared by casting 30% solution of PPS in e-caprolactam onto metal plates in a manner similar to that described in Example 2. The e-caprolactam was extracted from the membrane by soaking in water at 40° C. for 2 hours. The final thickness of the membrane was approximately 10 mil.

Flux of nitrogen = $F\ N_2 = 7 \times 10^{-2}$ cc/cm$^2$·sec·cmHg
Flux of water = $F\ H_2O = 5 \times 10^4$ cc/cm$^2$·sec·cmHg
Mean pore size = 0.159 micron
Max pore size = 0.272 micron.

EXAMPLE 4

Membranes from PPS and the Aqueous Alkali Soluble 4-Phenylphenol

A membrane was cast from a 30% solution of PPS and onto metal plates as in Example 2. The cast membrane was allowed to air cool to room temperature. The phenylphenol was extracted by soaking in a 3% NaOH solution at 40° C. for 1½ to 2 hours. The dried membrane was then evaluated for permeability and pore size. The final thickness of the membrane was approximately 6 mils.

Flux of nitrogen = $F\ N_2 = 22 \times 10^{-2}$ cc/cm$^2$·sec cmHg

Flux of water = $F\ H_2O = 5 \times 10^4$ ml/HR M$^2$·cmHg
Mean pore size = 0.349 micron
Max pore size = 0.925 micron.

EXAMPLE 5

60% PPS in DPS (Asymmetric)

A 60% solution of PPS in DPS was prepared. The membranes were prepared by casting solution onto a glass plate and then immersing the plate in a liquid. After immersion, the membranes were leached and dried as described in Example 2. The dramatic effect of the nature and temperature of the quench solution is illustrated by the following two experiments.

Example 5 (A): Quenched in water at 0° C.
$F\ N_2 = 5 \times 10^{-7}$ cc/cm$^2$·sec·cmHg Example 5 (B): Quenched in glycerol solution at 150° C. $F\ N_2 = 5 \times 10^{-4}$ cc/cm$^2$·sec·cmHg Thus, the effect of the hot glycerol quench was to increase the permeability to $N_2$ by a factor of 1000. The membrane having the $N_2 5 \times 10^{-4}$ was definitely asymmetric in character. The side (surface) which was brought in contact with the glycerol was "shiny", while the surface against the glass was quite dull in comparison.

EXAMPLE 6

Drawing of PPS Polymer

The schematic diagram indicates the steps of drawing the membrane at various stages in the process. This step may be done to modify the pore size, pore size distribution, permeability, or tensile properties of the membrane. The membranes may be drawn before the leach step, during the leach step, or after the leach step.

6(A) Draw Polymer before Leach Step

A solution of 60% PPS in DPS was prepared. The membranes were prepared by casting on a glass plate at various thickness by use of a casting bar:

| Casting Thickness (mil) | Membrane Quench Conditions (water) |
| --- | --- |
| 5 | 20° C. |
| 5 | 40° C. |
| 10 | 40° C. |

Since DPS is not soluble in water, the membranes When removed from the water are in an unleached condition. Pieces of the membrane were cut into rectangles for the draw experiments. The pieces were immersed in a glycerine at the draw temperature for approximately 20 seconds, and then drawn to break. The maximum draw before break is tabulated.

RESULTS

| | 5 mil/2° C. Water Quench | 5 mil/40° C. | 10 mil/40° C. |
|---|---|---|---|
| T °C. | Elong. % | % | % |
| 50 | 12 | | |
| 60 | 13 | | |
| 70 | 14 | | |
| 80 | 18 | | |
| 90 | 25 | | |
| 100 | 22 | 43 | 32 |
| 110 | 35 | 32 | 23 |
| 115 | 22 | | |
| 120 | 22 | | |
| 135 | 20 | | |
| 155 | 18 | | |

The membrane subjected to the draw step had greatly improved tensile properties over those of the undrawn samples. The drawn samples were flexible, and could be handled and bent without breakage when compared to the undrawn samples.

6(B) Post Leach Draw at Elevated Temperatures

Membranes were prepared from a 60% PPS in DPS solution as described in Example 6A. The membranes for this experiment were cast at 5 mil thickness and immediately quenched in 40° C. water. The membranes were leached in acetone and then dried. The leached membrane were immersed in a glycerine bath at the temperature of draw, and then drawn to maximum strain until break occurred. The membrane strips were initially 4.0 cm long, and drawn at a rate of 15 cm/min. The maximum draw was obtained was:

| T (°C.) | Max. Draw, % |
|---|---|
| 50 | 16 |
| 80 | 39 |
| 110 | 62 |
| 135 | 102 |
| 180 | 191 |

The membranes subjected to the draw step had greatly improved tensile properties over those of the undrawn samples. The drawn samples were flexible, and could be handled and bent without breakage when compared to undrawn samples.

(C) Drawing of Leached Films at Room Temperature

Membranes were prepared and leached as in Example 6B. Although the Tg of the PPS in 88° C., the microporous leached membranes can be drawn even at room temperature if the correct liquid is chosen. The maximum draw obtained in chloroform at room temperature was determined as a function of the residence time in chloroform before the draw was attempted.

| Residence Time in Chloroform | Maximum Draw (%) |
|---|---|
| 30 sec | 55 |
| 60 sec | 28 |
| 2 min | 83 |
| 5 min | 34-73 |

EXAMPLE 7

Examples 6A and 6B above illustrate the improvement in tensile properties of a membrane with the draw (elongation) step. The permeability of a membrane was examined without and with a pre-leach drawstep. Membranes were prepared from a 60% solution of PPS in diphenylsulfone (DPS).

The membranes were cast at 5 mil. thickness, and then quenched in water at 40° C. The membranes were leached and dried as described in Example 6.

7A—(no draw step) F $N_2 = 6.0 \times 10^{-7}$ cc/cm$^2$·sec·cmHg

7B—(given a 10% draw at 110° C.)=F $N_2 = 6.4 \times 10^{-7}$ cc/cm$^2$·sec·cmHg Thus, the draw step which improved the tensile properties of the membrane did not adversely effect the permeability.

A beneficial effect of the pre-leach draw step that is of importance is that the membrane (hollow fiber or film) preferably is continuously handled prior to the leaching step. Two membrane samples were prepared, and both had been prepared by quenching of the PPS/DPS in water at 40° C. One of the membranes was placed in a glycerine both at 110° C. for approximately 60 sec, with no drawing. The second membrane was placed in the glycerol bath for the same period of time, but was drawn 10% during the immersion. The improvement of the tensile properties of the the (drawn-not yet leached) membrane over the undrawn sample was demonstrated by comparing how much they could be bent without causing brittle cracking and failure of the film. Samples were cut approximately 0.25 in.×4.5 in. in length.

Each sample was bent into a loop until it broke the degree to which the sample could be bent without failure is defined by the radius of the circular (RC) portion of the film. See FIG. 6. FIG. 6 is a qualitative test for the green or final leached membrane. The distance d is the key parameter.

The results were as follows:

Quenched — (Glycerol bath treated without draw) —

$$\text{Unleached} - RC = \frac{d}{2} = 1.5 \text{ mm.}$$

Quenched — (10% draw in glycerol bath) —

$$\text{Unleached} - RC = 0.75 \text{ mm.}$$

Thus, the drawn film could be handled and processed much more easily than the undrawn sample.

EXAMPLE 8 (A)

PPS/e-CLTA (CAPROLACTAM) BINARY BLENDS

PPS (12 g) powder (FORTRON ® 0300-BO) and 28 g of e-CLTA Tm =70° C., b.p. =280° C.) were placed in a glass bottle and sealed with a piece of aluminum foil and wire. The sample in a glass bottle was placed in a forced air oven at 275° C. The PPS dissolved in about 30 to 45 min. The solution was mixed well by rotating the bottle. A pair of aluminum substrates were kept at room temperature, 100° C., 200° C. or at 275° C. The 30% PPS solution at 275° C. was poured onto one of the substrates. Immediately after being poured, the blend solution was covered by the other substrate and pressed to yield a 0.5 to 1 mm thick sheet. After being cooled down to room temperature, this binary blend sheet was immersed in a water bath for twelve hours to leach out e-CLTA and then vacuum dried for six hours. This cast procedure is comparable to a film extrusion where two rolls are utilized (see Process of FIG. 1B).

The samples prepared by the pour-pressing method had two distinct regions on their air side surfaces (Region I and Region II), which were originating from the solvent flash off occurred during the pour-pressing method. The melt blend took a hemispherical shape after being poured onto the bottom substrate, and the solvent continued to flash off from its surface until the top substrate was pressed on. Pressing the top substrate caused the melt blend to flow outward, and previously unexposed part of the melt blend came in contact with the substrates. Once covered, solidification of the PPS binary blend occurred without further loss of solvent. This solidification resulted in the creation of two distinct regions in the pour-pressed samples. Region I was located in the center of the sample, where solvent flash off from the air side surface occurred prior to solidification. The membranes prepared from this region had dense skin on the air side surface. Region II, surrounding Region I, where solidification of newly exposed (squeezed) melt blend occurred without solvent loss. The membranes prepared from Region II did not have skin on the air side surface.

PPS Membrane Evaluation—The PPS membranes thus prepared were tested for nitrogen permeability and water permeability. Pore size distributions were determined by the bubble point measurement method (ASTM F316-86). The results were summarized below in Table 3 and in Table 4.

TABLE 3

NITROGEN PERMEABILITY AND WATER PERMEABILITY MEASUREMENTS

| PPS Content (%) | Substrate Temp. (°C.) | Region (a) | N2 flux (b) | Water flux (c) |
|---|---|---|---|---|
| 30 | RT | Region I | 6.22 E-4 | |
| 30 | RT | Region II | 1.72 E-2 | |
| 30 | 100 | Region I | 1.35 E-3 | |
| 30 | 100 | Region II | 1.95 E-2 | 1.56 E + 3 |
| 30 | 200 | Region I | 5.09 E-3 | |
| 30 | 200 | Region II | 4.26 E-2 | 5.92 E + 3 |
| 30 | 275 | Region I | 1.93 E-2 | not measured |
| 30 | 275 | Region II | 3.56 E-2 | not measured |
| 30 (200° C. soln) | 200 | Region I | 2.06 E-2 | not measured |
| 30 (200° C. soln) | 200 | Region II | 3.13 E-2 | not measured |
| 40 (d) | 200 | Region II | 1.54 E-2 | not measured |
| 35 (d) | 200 | Region II | 1.69 E-2 | |
| 30 (d) | 200 | Region II | 4.26 E-2 | 5.92 E + 3 |
| 25 (d) | 200 | Region II | 7.04 E-2 | 2.70 E + 3 |
| 20 (d) | 200 | Region II | 1.24 E-1 | not measured |

(a) Region I: the membrane had surface skin (one side) due to solvent flash off. Region II: the membrane did not have surface skin because solvent flash off was suppressed.
(b) cc/sec*cm$^2$*cmHg
(c) cc/hr*m$^2$*cmHg
(d) These values are the formulated compositions.

TABLE 4

| PORE SIZE MEASUREMENT | | |
|---|---|---|
| Sample | Max. pore size (micron) | Mean pore size (micron) |
| 30/70 PPS/e-CLTA 275° C. soln, 200° C. substrates | 0.32 | 0.14 |
| 30/70 PPS/e-CLTA 275° C. soln, 100° C. substrates | 0.14 | |
| 25/75 PPS/e-CLTA 275° C. soln, 200° C. substrates | 0.33 | 0.07 |

These values were obtained after the water flux test, i.e., after being exposed to high pressure.

Based on these results, to make microporous PPS membranes from its binary blends with low molecular weight solvents, it is quite important to control the mode and the degree of thermally induced phase separation. By controlling the rate of cooling, the solidification behavior of PPS can be controlled to yield PPS membranes of preferred properties. The effect of solvent flash off during fabrication has to be minimized to prevent dense surface skin formation. However, this phenomena can be utilized to make an asymmetric membrane with a thin skin on one side.

EXAMPLE 8 (B)

Polyphenylene Sulfide and e-Caprolactam (CLTA)

Blends: A homogeneous mixture of the polymer and solvent were prepared by heating a mixture of the polymer and solvent to a temperature sufficient to cause melting and mixing of both components. This was accomplished utilizing a heated 2 L nitrogen blanketed resin kettle and a motor driven propeller for mixing. The minimum temperature for the blend preparation is the depressed melting point of the polymer solvent mixture. To ensure a quick mixing, the temperature can be raised to one above the melting point of the pure polymer.

Casting Procedure: In this example, two PYREX casting plates are utilized. The molten PPS-solvent mixture is poured onto the heated first plate. The first plate is kept above the solidification temperature of the PPS-solvent blend, the solution is then cast (utilizing a casting bar) along the first plate and onto the second cooler plate. This procedure simulates the film extrusion of the process of FIG. 1(A).

The experimental details of the casting procedure are as follows:

Hot Cast Film Procedure A':

(1) Pre-heat the furnace to melt and first plate temperature and the air oven to second plate cast temperature.

(2) Set-up two hot plates inside with a $\frac{1}{8}$ in thick aluminum sheet on top (See FIG. 1).

(3) Set hot plates to casting temperature (Setting is not absolute).

(4) Clean PYREX glass plates ($6\frac{1}{2}"\times 8"\times\frac{1}{8}"$) with acetone.

(5) Select a casting bar with the appropriate clearance (3 mil to 20 mil) for the desired film thickness. Clean the bar well. (Casting bar width = 6 in.)

(6) Weigh out approx. 40 g of blend granules in a 2 ox glass bottle, then seal the opening of the bottle with aluminum foil and a plastic cap.

(7) Place the glass bottle with the blend granules and the clean first glass plate (with the casting bar on the surface) in the pre-heat furnace, and the second glass plate in the air oven. Allow 30 to 50 min for the blend to melt and for the glass plate and casting bar to reach the casting temperature.

(8) After approx. 15 min, remove first glass plate from the furnace and the second glass plate from the air oven and place them on the aluminum sheet on top of the hot plates. Allow the glass plates temperatures to equilibrate on top of hot plates.

(9) Take casting bar out of furnace and place on the first glass plate.

(10) Remove bottle with melted blend from furnace, immediately remove plastic cap and all foil from bottle.

(11) Pour the melted blend on the surface of the first glass plate in front of the casting bar.

(12) Draw casting bar towards the body of blend through the first glass plate and onto the second cooler plate using a smooth, fast motion.

(13) Let the film solidify on the glass plates for 60 sec as the blend cools. Use a razor blade to separate the glass plates and then peel the freshly-formed film from the second glass plate.

Hot-Cast Film Procedure B'

Procedure B' is similar to procedure A' except that electric heating plates, and support aluminum plates are not used. The glass plates are heated to different temperatures in a furnace or oven. The first and second plates (at different temperatures) are removed and placed on non-heated ceramic tiles. When the temperature of the plates reaches the desired temperature, the films are cast as in procedure AA, see Table t below).

FIG. 7 shows the effect of temperature of the top and bottom substrate between which a molten PPS/solvent mixture is quenched. The nitrogen permeability of the final leached membrane is changed. Generally, the higher the quench temperature, the higher the nitrogen permeability (and is comparable to the process of FIG. 1(A), 1(B) or 2(B).

TABLE 6

PPS/DPS AT DIFFERENT QUENCH TEMPERATURES

| Sample | Quench Temp. (°C.) | N2 Flux (cc/sec*cm$^2$*cmHg) | Max. Pore (micron) | Mean Pore (micron) |
|---|---|---|---|---|
| Pour-pressed with Al substrates | 25 | $8.18 * 10^{-4}$ | <0.13 | — |
| | 100 | $2.34 * 10^{-3}$ | 0.21 | — |
| | 200 | $2.91 * 10^{-2}$ | 2.30 | 0.62 |
| Pour-pressed with TEFLON ™ substrates | 25 | $1.34 * 10^{-3}$ | | |
| | 100 | $3.60 * 10^{-3}$ | Not Measured | |
| | 200 | $6.08 * 10^{-2}$ | | |
| Pour-pressed with glass substrates | 25 | $1.50 * 10^{-4}$ | | |
| | 100 | $4.93 * 10^{-3}$ | Not Measured | |
| | 200 | $2.97 * 10^{-2}$ | | |
| Extruded | 25 | $6.81 * 10^{-4}$ | <0.13 | — |

TABLE 5

PPS/DPS BINARY BLENDS

| Sample | Method | Bulk Structure (*) | Solidification Process () | Second Plate Glass Temp. (°C.) | Nitrogen (*) | N/s | Water (****) | N/s | Mean (micron) | Max (micron) | N/s |
|---|---|---|---|---|---|---|---|---|---|---|---|
| 30/70 PPS/CLTA | A | N | L-S | 35 | $9.93 \times 10^{-2}$ | 1/— | 11300 | 1/— | 0.11 | 0.31 | 1/— |
| 30/70 PPS/CLTA | A | N | L-S | 90 | $12.30 \times 10^{-2}$ | 1/— | 17200 | 1/— | 0.10 | 0.31 | 1/— |
| 30/70 PPS/CLTA | A | N | L-S | 150 | $13.90 \times 10^{-2}$ | 1/— | 19400 | 1/— | 0.10 | 0.36 | 1/— |
| 40/60 PPS/CLTA | A | N | L-S | 35 | $1.60 \times 10^{-2}$ | 1/— | 838 | 1/— | — | <0.13 | 1/— |
| 40/60 PPS/CLTA | A | N | L-S | 90 | $1.71 \times 10^{-2}$ | 1/— | 1230 | 1/— | — | 0.16 | 1/— |
| 40/60 PPS/CLTA | A | N | L-S | 150 | $0.84 \times 10^{-2}$ | 1/— | 408 | 1/— | — | 0.14 | 1/— |

(*) N: Nodular; C: Cellular;
(**) L-L: Liquid-Liquid; L-S: Liquid-Solid;
(***) cc/cm$^2$ · sec · cmHg;
(****) cc/m$^2$ · hr · cmHg

EXAMPLE 9

PPS/DPS Binary Blends

PPS powder (12 g) (FORTRON® 0300-BO) and diphenyl sulfone (28 g) (DPS, Tm=128° C., b.p. =379° C.) were placed in a glass bottle and sealed with a piece of aluminum foil and wire. The sample in a glass bottle was placed in a forced air oven at 310° C. It took about 30 to 45 min to dissolve PPS. The solution was mixed well by rotating the bottle. A pair of substrates (aluminum, TEFLON®, or glass) were kept at ambient temperature, 100° or 200° C., and the 30% PPS solution at 310° C. was poured onto one of the substrates at the indicated temperature. Immediately after the pouring, the blend solution was covered by the other substrate at the same temperature and pressed to yield at 0.5 to mm thick sheet. After being cooled down to ambient temperature, this blend sheet was immersed in an acetone bath for two hr to leach out DPS and then vacuum dried for two hr.

PPS Membrane Evaluation—The PPS membranes thus prepared were tested for nitrogen permeability. Their pore size distributions were determined by the bubble point measurement method (ASTM F316-86). The results were summarized below, see Table 6 below.

EXAMPLE 9 (B)

PPS and Diphenylsulfone (DPS)

The permselective membranes were prepared by adaption were prepared by adaption of the procedures described in Example 8 (B) above.

The proportions and physical properties are shown below in Table 7 below.

FIG. 8 shows the effect on nitrogen permeability of the final leached PPS membrane by the varying effective quench temperature. These PPD/DPS membranes are prepared by adaption of the processes of Examples 8(A) or 8(B). Generally, the higher the quench temperature, the higher the nitrogen permeability using the processes illustrated in FIGS. 1(A), 1(B), 2(A) and 2(B).

TABLE 7

PPS/DPS BINARY BLENDS

| Sample | Method | Bulk Structure (*) | Solidification Process () | Second Plate Glass Temp. (°C.) | Nitrogen (*) | N/s | Water (****) | N/s | Mean (micron) | Max (micron) | N/s |
|---|---|---|---|---|---|---|---|---|---|---|---|
| 30/70 PPS/DPS | A | C | L-L | 35 | $0.78 \times 10^{-2}$ | 1/— | 1010 | 1/— | 0.09 | 0.42 | 1/— |
| 30/70 PPS/DPS (water) | A | C | L-L | 35 | $0.51 \times 10^{-2}$ | 1/— | 580 | 1/— | — | 0.15 | 1/— |
| 30/70 PPS/DPS (glycerol) | A | C | L-L | 35 | $0.66 \times 10^{-2}$ | 1/— | 1400 | 1/— | — | 0.24 | 1/— |
| 30/70 PPS/DPS | A | C | L-L | 90 | $0.11 \times 10^{-2}$ | 1/— | — | — | — | <0.13 | 1/— |

TABLE 7-continued

PPS/DPS BINARY BLENDS

| Sample | Method | Bulk Structure (*) | Solidification Process () | Second Plate Glass Temp. (°C.) | Nitrogen (*) | N/s | Water (****) | N/s | Mean (micron) | Max (micron) | N/s |
|---|---|---|---|---|---|---|---|---|---|---|---|
| 30/70 PPS/DPS | B | C | L-L | 150 | $0.09 \times 10^{-2}$ | 1/— | — | — | — | <0.13 | 1/— |
| 30/70 PPS/DPS | B | C | L-L | 190 | $8.79 \times 10^{-2}$ | 1/— | 7800 | 1/— | 0.26 | 2.31 | 1/— |
| 30/70 PPS/DPS | B | C | L-L | 225 | $111.00 \times 10^{-2}$ | 1/— | — | — | — | — | — |
| 40/60 PPS/DPS | A | C | L-L | 35 | $0.03 \times 10^{-2}$ | 1/— | — | — | — | <0.13 | 1/— |
| 40/60 PPS/DPS | A | C | L-L | 90 | $0.04 \times 10^{-2}$ | 1/— | — | — | — | <0.13 | 1/— |
| 40/60 PPS/DPS | B | C | L-L | 150 | $0.12 \times 10^{-2}$ | 1/— | — | — | — | <0.13 | 1/— |

(*) N: Nodular; C: Cellular;
(**) L-L: Liquid-Liquid; L-S: Liquid-Solid;
(***) cc/cm$^2$ · sec · cmHg;
(****) cc/m$^2$ · hr · cmHg FIG. 9 is a graph showing water permeability of the 30/70 PPS/DPS blend. FIG. 9 shows the effect of the temperature of the liquid solution quench upon the final water permeability of a leached membrane, similar to the processes of FIG. 2(A) or 2(B). The higher temperature of the quench liquid, the higher water permeability of the final leached membrane.

EXAMPLE 10 (A)

Membranes of PPS and Diphenylphthalate Blends

DPTP, DPIP and the commercially obtained blend of DPIP, DPTP (75%/25%) were mixed 50/50 (w/w) with PPS and heated to 315° C. for 20 min and allowed to passively mix and then stirred by a gentle mixing motion of the glass jar holding the blend. All samples had an identical translucent amber color. Translucence is a good visual indication of miscibility. Upon solidification, the blends all possessed the same gray/light brown color. A differential scanning calorimeter (DSC) thermograph obtained from the DPIP/DPTP blend indicated from a 24° C. melting point depression that PPS was indeed solvated by the DPIP/DPTP blend. The observed melting point depression and recrystallization temperature is nearly the same as that found for diphenylsulphone, a material known to be a good solvent of PPS.

A blend of 50% PPS, 40% DPIP/DPTP blend, 10% PS was prepared in a resin kettle by the addition of PS followed by PPS. All the materials was observed to be in solution at 310° C., possessing a translucent amber color. The material then solidified in a homogeneous way with a uniform gray/light brown coloring, see Table 8.

the higher the quench temperature the higher the nitrogen permeability.

FIG. 11 is a graph of the water permeability of PPS membranes for PPS/DPIP binary blend as a function of quench temperature. FIG. 11 shows the effect of the quenching plate temperature upon the water permeability of the final leached membrane as found in FIGS. 1(A) or 1(B). Generally, the higher the quench temperature the higher the water permeability.

EXAMPLE 10 (B) PPS AND DIPHENYLISOPHTHALATE (DPIP)

Membranes were prepared by the procedures described in 8 (B), e.g. see Table 5 for conditions.

Table 8 shows some blends of PPS/DPIP.

EXAMPLE 11

PPS and DPS

Microporous PPS membranes were fabricated by extruding the binary blends of PPS/diphenylsulfone followed by acetone leach. The results were summarized below:

PPS powder (30 wt% or 40 wt%) and diphenylsulfone (70 wt% or 40 wt%) were free mixed in a vinyl bag. This powder blend was extruded by a twin screw with a COCH ® static mixer with four ½ in mixing units and a 2 and ¼ in wide slit die. The temperature profile and the other operating conditions are listed below in Table 9. The extruded blend was cooled on the surface of the aluminum roller operated at the speed to make the draw down ratio of the melt close to one. It was difficult to extrude the 30/70 PPS/DPS blend due to its low viscosity, and the gap of the die had to be adjusted

TABLE 8

PPS/DPIP (DIPHENYL ISOPHTHALATE) BINARY BLENDS

| Sample | Method | Solidification Process () | Second Plate Glass Temp. (°C.) | Nitrogen (*) | N/s | Water (****) | N/s | Mean (micron) | Max (micron) | N/s |
|---|---|---|---|---|---|---|---|---|---|---|
| 30/70 PPS/DPIP | A | L-L | 90 | $4.00 \times 10^{-2}$ | 2/0.001 | 4000 | 2/1000 | 0.10 | 0.16 | 1/— |
| 30/70 PPS/DPIP | A | L-L | 150 | $21.50 \times 10^{-2}$ | 2/0.075 | 28500 | 2/500 | — | 1.00 | 1/— |
| 40/60 PPS/DPIP | A | L-L | 90 | $3.73 \times 10^{-2}$ | 3/0.01 | 5000 | 2/3000 | <0.10 | 0.23 | 2/0.07 |
| 40/60 PPS/DPIP | A | L-L | 150 | $20.30 \times 10^{-2}$ | 3/0.12 | 29000 | 3/22000 | 0.10 | 2.20 | 2/1.80 |

(*) N: Nodular; C: Cellular;
(**) L-L: Liquid-Liquid; L-S: Liquid-Solid;
(***) cc/cm$^2$ · sec · cmHg;
(****) cc/m$^2$ · hr · cmHg FIG. 10 is a graph of the nitrogen permeability of PPS membrane of PPS/DPIP binary blend as a function of quench temperature. FIG. 10 shows the effect of the quenching plate temperature upon the nitrogen permeability of the final leached membrane as performed by process of FIGS. 1(A) or 1(B). Generally, from time to time to obtain the best possible result. Because of this, the shear rate at the tip of the die was not determined. Films between about 1 and ½ in wide and between 0.5 to mm thick were obtained. The extruded films were further processed in the same manner as described in the above section. The extrusion procedure and the setup are conventional.

TABLE 9

TWIN SCREW EXTRUSION CONDITIONS TEMPERATURE PROFILE
PPS (300-BO)/DPS; 30/70

| 1 | 2 | 3 | 4 | 5 | 6 | TM | PuM | PaM | Clp. | Koch | Koch | Koch | Die |
|---|---|---|---|---|---|----|-----|-----|------|------|------|------|-----|
| 25 | 150 | 310 | 310 | 290 | 285 | 285 | 255 | 250 | 240 | 245 | 240 | 240 | 240 |
| (60) | (180) | (278) | (310) | (291) | (288) | (286) | (256) | (250) | (250) | (245) | (240) | (240) | (240) |

| | |
|---|---|
| SCREW SPEED: | 150–250 |
| PUMP SPEED: | 0–1700 |
| K-tron SPEED: | 0–425 |
| EXTRUSION RATE: | —g/min |
| DISCHARGE PRESSURE: | 600 psi |
| SUCTION PRESSURE: | 0 psi |
| DISCHARGE MELT TEMP.: | 256.8 |
| TRANSITION MELT TEMP.: | 269.9 |

EXAMPLE 12

PPS Membrane Evaluation

The PPS membranes prepared in Example 11 were tested for nitrogen permeability. Their pore size distributions were determined by the bubble point measurement method (ASTM F316-86). The results were summarized below. (Also see FIG. 7.

| Composition | Quench Temp. (°C.) | N2 Flux (cc/sec*cm$^2$*cmHg) | Max. Pore (micron) | Mean Pore (micron) |
|---|---|---|---|---|
| 30/70 | 25 | 6.81 * 10$^{-4}$ | <0.13 | — |
| 40/60 | 25 | 1.67 * 10$^{-4}$ | <0.13 | — |

The water flux measurement and the bubble point measurement were not performed. Maximum pore size was determined by the maximum pressure obtainable by the setup (70 pis), which did not create any bubble, see Table 10 below.

EXAMPLE 13

PPS/NCHP Solvent/Non-solvent 0.6 g powder PPS is mixed with a solvent comprising 4 g N-cyclohexyl-2-pyrrolidone and 2 g o-chloronaphthalene according to the following procedure.

PPS secured from Philips Petroleum under the trademark Ryton P-6 in the form of a powder is mixed with solvents identified. The solvents and PPS are heated on a Sybron Nuova-II hot plate at the highest setting (producing a surface temperature of about 290° C.) to dissolve the PPS. Heating is continued until the solution is clear and dark brown in color.

The solution is heated for 1 hour. At the conclusion of the heating period the solution is observed to be clear and brownish. Heating for additional time (20-30 min) does not result in any further color change.

A heated glass plate was preheated on the hot plate. The PPS solution was cast on the heated glass plate in the shape of a flat sheet membrane then cooled to room temperature.

After casting and water washing, the membrane is soaked in excess acetone for 30 min, the air dried. Dried membranes appeared white and opaque. FIG. 12 is an electron scanning micrograph of the air contacting surface of the membrane thus formed. The SEM scale is cm represents 0.89 micron. The interconnecting pore structure is apparent from the micrograph. The pore size visible in the micrograph ranges from 0.2 to 0.8 μm. The membrane is useful for microfiltration.

EXAMPLE 14

Membranes Prepared from PPS/NCHP Solutions 0.6 g of PPS (Idemitsu-high molecular weight) was mixed with 6 cc NCHP in a glass bottle. The mixture was processed and the membranes were cast following the same procedures as described in Example 12. The membranes were shown to be mechanically strong. The membrane was white and opaque and appeared to be shiny on the water-contacting surface. Several membranes were made with slight variations in the time between casting and immersion. The flow and filtration properties were tested by using Amicon 50 cc stir cells. The percent retention was evaluated based on UV absorption. The results are shown as follows:

| Sample No. | Flow Rate GFD @ 16 psig | Feed Solution | Retention |
|---|---|---|---|
| 1 | 5.2 | 1% PS latex 0.091 μm | 99% |
| 2 | 2.9 | 0.5% Polyvinyl pyrrolidone MW-360.000 | 80% |

EXAMPLE 15

PPS/Solvent Systems

In Table 10 and 11 below are listed the experiment using various concentrations of PPS and solvents. The blending temperature for experiments in Table 10 is 260° C., expect for PPS/DPS which was 280° C. The time of blend was about 1 hr.

Footnotes for Tables 10 and 11

(a) Flexibility of leached polymer here means "bendability" for easier handling. "v." means very.

(b) Tensile strength of leached membrane.

(c) Of leached membrane.

(d) Green strength means the pliability of the unleached membrane right after casting process (polymer is warm and cooling). When the green strength is high, it is easier for handling during subsequent handling or processing.

TABLE 10

| Composition | PPS/SOLVENT SYSTEM | Nitrogen Perm. | Flexibility[a] | T. Strength[b] (psi) | Elongation[c] (%) | Green[d] Strength |
|---|---|---|---|---|---|---|
| PPS/DPS | 30/70 | $2.89 \times 10^{-3}$ | v. flexible | 1462 | 21.2 | bad |
| PPS/DPS | 25/75 | $6.13 \times 10^{-3}$ | v. flexible | 1337 | 32.9 | bad |
| PPS/DPS | 20/80 | $2.00 \times 10^{-2}$ | v. flexible | 857 | 26.0 | bad |
| PPS/DPS/CHPN | 30/52.5/17.5 | $1.69 \times 10^{-2}$ | v. flexible | 1071 | 21.4 | good |
| PPS/DPS/CHPN | 30/35/35 | $5.96 \times 10^{-2}$ | brittle | — | — | good |
| PPS/DPS/CHPN | 30/17.5/52.5 | — | very brittle | — | — | bad |
| PPS/CHPN | 30/70 | $3.51 \times 10^{-2}$ | flexible | 598 | 8.2 | v. good |
| PPS/CLTA | 30/70 | $5.37 \times 10^{-2}$ | brittle | 435 | 5.4 | poor |
| PPS/CLTA/CHPN | 30/52.5/17.5 | $4.96 \times 10^{-2}$ | flexible | 441 | 5.6 | good |
| PPS/CLTA/CHPN | 30/35/35 | $5.37 \times 10^{-2}$ | flexible | 382 | 4.5 | good |
| PPS/CLTA/CHPN | 30/17.5/52.5 | $5.63 \times 10^{-2}$ | flexible | 487 | 6.7 | good |

TABLE 11

| Composition | PPS/SOLVENT SYSTEMS | Nitrogen Perm. | Flexibility[a] | T. Strength[b] (psi) | Elongation[c] (%) | Green[d] Strength |
|---|---|---|---|---|---|---|
| PPS/DPS | 30/70 | $2.89 \times 10^{-3}$ | v. flexible | 1462 | 21.2 | bad |
| PPS/DPS | 25/75 | $6.13 \times 10^{-3}$ | v. flexible | 1337 | 32.9 | bad |
| PPS/DPS | 20/80 | $2.00 \times 10^{-2}$ | v. flexible | 857 | 26.0 | bad |
| PPS/DPS/CHPN | 30/52.5/17.5 | $1.69 \times 10^{-2}$ | v. flexible | 1071 | 21.4 | good |
| PPS/DPS/CHPN | 30/35/35 | $5.96 \times 10^{-2}$ | brittle | 306 | 2.7 | good |
| PPS/DPS/CHPN | 30/17.5/52.5 | — | very brittle | — | — | bad |
| PPS/CHPN | 30/70 | $3.51 \times 10^{-2}$ | flexible | 598 | 8.2 | v. good |
| PPS/CLTA | 30/70 | $5.37 \times 10^{-2}$ | brittle | 435 | 5.4 | poor |
| PPS/CLTA/CHPN | 30/52.5/17.5 | $4.96 \times 10^{-2}$ | flexible | 441 | 5.6 | good |
| PPS/CLTA/CHPN | 30/35/35 | $5.37 \times 10^{-2}$ | flexible | 382 | 4.5 | good |
| PPS/CLTA/CHPN | 30/17.5/52.5 | $5.63 \times 10^{-2}$ | flexible | 487 | 6.7 | good |

In Table 11, the first six experiments are run at 280° C. for 1 hr. The last six experiments were run at 260° C. for 1 hr. The footnotes for Table 11 are the same as found in Table 10. The results are self evident under the specific reaction conditions used. Poor results may be improved when additional experiments are performed.

While only a few embodiments of the invention have been shown and described herein, it will become apparent to those skilled in the art that various modifications and changes can be made in the process and compounds to solubilize poly(phenylene sulfide) to form an article, preferably a permselective fiber or film membrane, of manufacture without departing from the spirit and scope of the present invention. All such modifications and changes coming within the scope of appended claims are intended to be covered thereby.

We claim:

1. A process for preparing a permselective microporous membrane comprising poly(phenylene sulfide), which process comprises the steps of:
   (a) forming a mixture comprising:
      (i) poly(phenylene sulfide)
      (ii) at least one solvent for the polyphenylene sulfide;
   (b) heating the mixture to a temperature under conditions such that a homogeneous fluid is formed which possesses sufficient viscosity to be formed into a membrane;
   (c) extruding or casting the homogeneous fluid into a membrane form;
   (d) quenching or coagulating the membrane by passing the membrane through one or more zones under physical conditions such that the membrane solidifies; and
   (e) simultaneously or consecutively leaching the membrane by passing the membrane through one or more zones under conditions such that at least a substantial portion of the solvent for the polyphenylene sulfide is removed from the membrane; wherein the permselective membrane so formed possesses a microporous structure.

2. The process of claim 1 wherein the solvent is an organic compound independently selected from the group consisting of 4,4'-dibromobiphenyl; 1-phenyl-naphthalene; phenothiazine;2,5-diphenyl-1,3,4-oxadiazole;2,5-diphenyloxazole; triphenyl-methanol; N,N-diphenylformamide; m-terphenyl; benzil; anthracene; 4-benzoylbiphenyl; dibenzoylmethane; 2-biphenyl-carboxylic acid; dibenzothiophene; pentachlorophenol; benzophenone; 1-benzyl-2-pyrrolidione; 9-fluorenone; 2-benzoyl-naphthalene; 1-bromonaphthalene; diphenyl sulfide; 1,3-diphenoxy-benzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromo-biphenyl; 2-phenylphenol; thianthrene; 4,4'-diphenylbenzo-phenone; 3-phenoxybenzyl alcohol; 4-phenylphenol; 9,10-dichloroanthracene; p-terphenyl; 2-phenoxybiphenyl; triphenyl-methane; 4,4'-dimethoxybenzophenone; 9,10-diphenylanthracene; fluoranthene; diphenyl sulfone; diphenyl phthalate; diphenyl- carbonate; 2,6-dimethoxynaphthalene; 2,7-dimethoxynaphthalene; 4-bromodiphenyl ether; pyrene; 9,9'-bi-fluorene; 4,4'-isopropyl-lidenediphenol; 2,4,6-trichlorophenol, epsilon-caprolactam, N-cyclohexyl-2-pyrrolidone, diphenylisophthalate, diphenylterphthalate, and mixtures of these compounds.

3. The process of claim 2 wherein the solvent is independently selected from the group consisting of diphenylsulfone, N-caprolactam, and N-cyclohexyl-2-pyrrolidone.

4. The process of claim 3 wherein the solvent is N-cyclo-hexyl-2-pyrrolidone and in step (b) the homogenous fluid is heated to an elevated temperature and for a time sufficient to cause the fluid to change color from light to dark (tan) in color.

5. The process of claim 1 which further comprises:
(a) drawing the membrane before, during and/or after leaching of step (e) at a temperature at or above ambient temperature and below the melting point of the polyphenylene sulfide or the depressed melting point of the mixture to elongate the membrane and to induce orientation of the polyphenylene sulfide in the membrane.

6. The process of claim 5 wherein the solvent is independently selected from the group consisting of 4,4'-dibromobiphenyl; 1-phenyl-naphthalene; phenothiazine; 2,5-diphenyl-1,3,4-oxadiazole; 2,5-diphenyloxazole; triphenylmethanol; N,N-diphenylformamide; m-terphenyl; benzil; anthracene; 4-benzoylbiphenyl; dibenzoylmethane; 2-biphenyl-carboxylic acid; dibenzothiophene; pentachlorophenol; benzophenone; 1-benzyl-2-pyrrolidione; 9-fluorenone; 2-benzoyl-naphthalene; 1-bromonaphthalene; diphenyl sulfide; 1,3-diphenoxy-benzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromo-biphenyl; 2-phenylphenol; thianthrene; 4,4'-di-phenylbenzo-phenone; 3-phenoxybenzyl alcohol; 4-phenylphenol; 9,10-dichloroanthracene; p-terphenyl; 2-phenoxybiphenyl; triphenyl-methane; 4,4'-dimethoxybenzophenone; 9,10-diphenylanthracene; fluoranthene; diphenyl sulfone; diphenyl phthalate; diphenyl- carbonate; 2,6-dimethoxynaphthalene; 2,7-dimethoxynaphthalene; 4-bromodiphenyl ether; pyrene; 9,9'-bi-fluorene; 4,4'-isopropyl-lidenediphenol; 2,4,6-trichlorophenol, epsilon-caprolactam, N-cyclohexyl-2-pyrrolidone, diphenylisophthalate, diphenylterphthalate, and mixtures of these compounds.

7. The process of claim 6 wherein the solvent is selected from the group consisting of diphenylsulfone, N-caprolactam, and N-cyclohexyl-2-pyrrolidone.

8. A process for preparing a permselective microporous membrane comprising poly(phenylene sulfide), which process comprises the steps of:
(a) forming a mixture comprising:
  (i) (polyphenylene sulfide)
  (ii) at least one solvent for the polyphenylene sulfide;
  (iii) at least one non-solvent for the polyphenylene sulfide;
(b) heating the mixture to a temperature under conditions such that a homogeneous fluid is formed which possesses sufficient viscosity to be formed into a membrane;
(c) extruding or casting the homogeneous fluid into a membrane;
(d) quenching or coagulating the membrane by passing the membrane through one or more zones under physical conditions such that the membrane solidifies; and
(e) simultaneously or consecutively leaching the membrane by passing the membrane through one or more zones under conditions such that at least a substantial portion of the solvent and non-solvent for the polyphenylene sulfide is removed from the membrane;
wherein the semi-permeable membrane so formed possesses a microporous structure.

9. The process of claim 8 wherein the solvent is an organic compound independently selected from the group consisting of 4,4'-dibromobiphenyl; 1-phenyl-naphthalene; phenothiazine;2,5-diphenyl-1,3,4-oxadiazole;2,5-diphenyloxazole; triphenyl-methanol; N,N-diphenylformamide; m-terphenyl; benzil; anthracene; 4-benzoylbiphenyl; dibenzoylmethane; 2-biphenyl-carboxylic acid; dibenzothiophene; pentachlorophenol; benzophenone; 1-benzyl-2-pyrrolidione; 9-fluorenone; 2-benzoyl-naphthalene; 1-bromonaphthalene; diphenyl sulfide; 1,3-diphenoxy-benzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromo-biphenyl; 2-phenylphenol; thianthrene; 4,4'-diphenylbenzo-phenone; 3-phenoxybenzyl alcohol; 4-phenylphenol; 9,10-dichloroanthracene; p-terphenyl; 2-phenoxybiphenyl; triphenyl-methane; 4,4'-dimethoxybenzophenone; 9,10-diphenylanthracene; fluoranthene; diphenyl sulfone; diphenyl phthalate; diphenyl- carbonate; 2,6-dimethoxynaphthalene; 2,7-dimethoxynaphthalene; 4-bromodiphenyl ether; pyrene; 9,9'-bi-fluorene; 4,4'-isopropyl-lidenediphenol; 2,4,6-trichlorophenol, epsilon-caprolactam, N-cyclohexyl-2-pyrrolidone, diphenylisophthalate, diphenylterphthalate, and mixtures of these compounds.

10. The process of claim 9 wherein the non-solvent is independently selected from the group consisting of 1,3,5-triphenylbenzene, tetra-phenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphos-phoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, and 4,4'-dihydro-xybenzo-phenone.

11. The process of claim 8 wherein the non-solvent is independently selected from the group consisting of 1,3,5-triphenylbenzene, tetra-phenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphos-phoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, 4,4'-dihydroxybenzophenone, and mixtures of these compounds.

12. The process of claim 8 which further comprises:
(a) drawing the membrane before, during and/or after leaching of step (e) at a temperature at or above the ambient temperature and below the melting point of the polyphenylene sulfide or the depressed melting point of the mixture to elongate the membrane and to induce orientation of the polyphenylene sulfide in the membrane.

13. The process of claim 12 wherein the solvent is an organic compound independently selected from the group consisting of 4,4'-dibromobiphenyl; 1-phenylnaphthalene; phenothiazine;2,5-diphenyl-1,3,4-oxadiazole;2,5-diphenyloxazole; triphenyl-methanol; N,N-diphenylformamide; m-terphenyl; benzil; anthracene; 4-benzoylbiphenyl; dibenzoylmethane; 2-biphenyl-carboxylic acid; dibenzothiophene; pentachlorophenol; benzophenone; 1-benzyl-2-pyrrolidione; 9-fluorenone; 2-benzoyl-naphthalene; 1-bromonaphthalene; diphenyl sulfide; 1,3-diphenoxy-benzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3-triphenylbenzene; triphenylene; 4 bromo-biphenyl; 2-phenylphenol; thianthrene; 4,4'-diphenylbenzo-phenone; 3-phenoxybenzyl alcohol; 4-phenylphenol; 9,10-dichloroanthracene; p-terphenyl; 2-phenoxybiphenyl; triphenyl-methane; 4,4'-dimethoxybenzophenone; 9,10-diphenylanthracene; fluoranthene; diphenyl sulfone; diphenyl phthalate; diphenyl- carbonate; 2,6-dimethoxynaphthalene; 2,7-dimethoxynaphthalene; 4-bromodiphenyl ether; pyrene; 9,9'-bi-fluorene; 4,4'-isopropyl-lidenediphenol; 2,4,6-trichlorophenol, epsilon-caprolactam, N-cyclohexyl-2-pyrrolidone, diphenylisophthalate, diphenylterphthalate, and mixtures of these compounds.

14. The process of claim 13 wherein the non-solvent is independently selected from the group consisting of 1,3,5-triphenylbenzene, tetra-phenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphos-phoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, 4,4'-dihydroxybenzophenone, and mixtures of these compounds.

15. The process of claim 12 wherein the non-solvent is independently selected from the group consisting of 1,3,4-triphenylbenzene, tetra-phenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphos-phoric acid, dioctyl phthalate, 5-chlorobenzoxazolone, bis-(4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, 4,4'-dihydroxybenzophenone and mixtures of these compounds.

16. The process of claim 3 wherein the solvent of step (a) is independently selected from the group consisting of diphenylphthalate, diphenyliso-phthalate, diphenylterphthalate and mixtures thereof.

17. The process of claim 5 wherein the membrane is drawn to an elongation ratio of between about 1.05 and about 10.

18. The process of claim 12 wherein membrane is drawn to an elongation ratio of between about 0.015 and about 10.

* * * * *